(12) United States Patent
Chewchut

(10) Patent No.: US 11,405,512 B2
(45) Date of Patent: Aug. 2, 2022

(54) ELECTRONIC DEVICE AND IMAGE FORMING APPARATUS CAPABLE OF EDITING DOCUMENT IMAGES FORMING DOCUMENT IMAGE SEQUENCE AND CONVERTING DOCUMENT IMAGE SEQUENCE TO MOVING IMAGE

(71) Applicant: KYOCERA Document Solutions Inc., Osaka (JP)

(72) Inventor: Marvin Joshua Chewchut, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/359,293

(22) Filed: Jun. 25, 2021

(65) Prior Publication Data
US 2022/0006910 A1   Jan. 6, 2022

(30) Foreign Application Priority Data
Jul. 2, 2020   (JP) .............................. JP2020-115139

(51) Int. Cl.
*H04N 1/04* (2006.01)
*H04N 1/00* (2006.01)
*H04N 1/12* (2006.01)

(52) U.S. Cl.
CPC ..... *H04N 1/00241* (2013.01); *H04N 1/00129* (2013.01); *H04N 1/00148* (2013.01); *H04N 1/121* (2013.01)

(58) Field of Classification Search
CPC .......... H04N 1/00241; H04N 1/00129; H04N 1/00148; H04N 1/121
See application file for complete search history.

(56) References Cited

U.S. PATENT DOCUMENTS

| 2003/0016942 | A1* | 1/2003 | Tojo | H04N 5/772 386/230 |
| 2007/0212144 | A1* | 9/2007 | Matsuzaka | H04N 1/00132 400/62 |
| 2012/0099128 | A1* | 4/2012 | Yoshida | H04N 1/00424 358/1.13 |

FOREIGN PATENT DOCUMENTS

| JP | 2012-044451 A | 3/2012 |
| KR | 10-0374914 B1 | 3/2003 |
| KR | 10-2005-0078100 A | 8/2005 |
| KR | 10-2006-0021032 A | 3/2006 |

* cited by examiner

*Primary Examiner* — Moustapha Diaby
(74) *Attorney, Agent, or Firm* — IP Business Solutions, LLC

(57) ABSTRACT

An electronic device includes a storage device, a display device, and a control device. The storage device stores a document image sequence in which a plurality of document images of original documents are arranged in chronological order. The control device functions as an editor, a converter, and a display controller. The editor performs edition processing on the document images forming the document image sequence. The converter converts the document image sequence edited by the editor to a moving image. The display controller allows the display device to display the document images forming the document image sequence in an image display area of the display device.

4 Claims, 24 Drawing Sheets

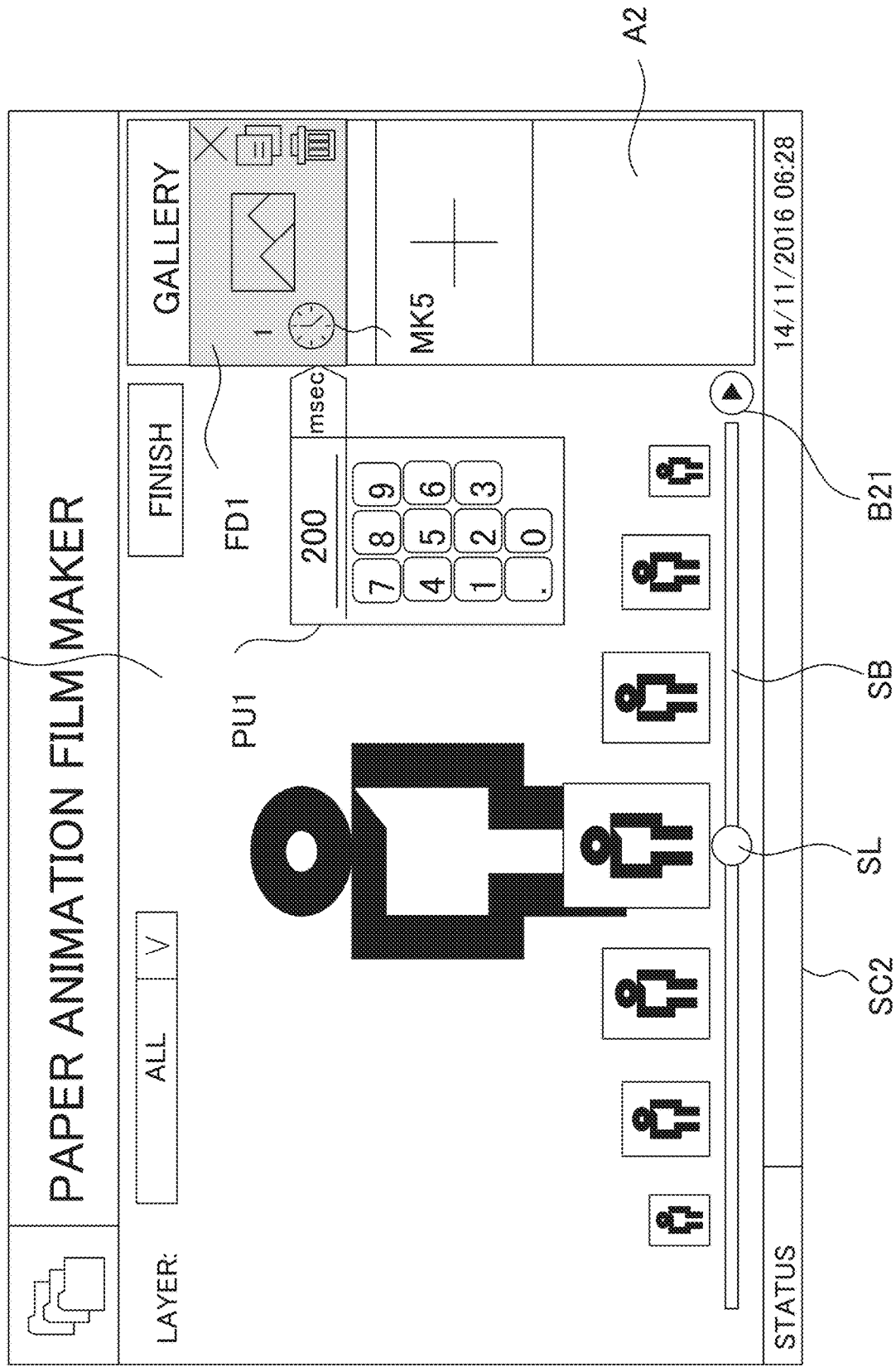

ELECTRONIC DEVICE AND IMAGE FORMING APPARATUS CAPABLE OF EDITING DOCUMENT IMAGES FORMING DOCUMENT IMAGE SEQUENCE AND CONVERTING DOCUMENT IMAGE SEQUENCE TO MOVING IMAGE

INCORPORATION BY REFERENCE

This application claims priority to Japanese Patent Application No. 2020-115139 filed on 2 Jul., 2020, the entire contents of which are incorporated by reference herein.

BACKGROUND

The present disclosure relates to electronic devices and image forming apparatuses each having the function of reading an image of an original document.

There is a technique for continuously displaying images on a display device to create a slide show and producing motion from continuously displayed images to create an animation. Generally, a technique is known for creating, on a personal computer or the like, a moving image by putting together images present in an image file storage. Also, a technique is known for creating an animation from images acquired by a scanning device having scanned original documents.

SUMMARY

A technique improved over the aforementioned techniques is proposed as one aspect of the present disclosure.

An electronic device according to an aspect of the present disclosure includes a storage device, a display device, and a control device. The storage device stores a document image sequence in which a plurality of document images of original documents are arranged in chronological order. The control device includes a processor and functions, through the processor executing a control program, as an editor, a converter, and a display controller. The editor performs edition processing on the document images forming the document image sequence. The converter converts the document image sequence edited by the editor to a moving image. The display controller allows the display device to display the document images forming the document image sequence in an image display area of the display device.

DETAILED DESCRIPTION

Figure 1:
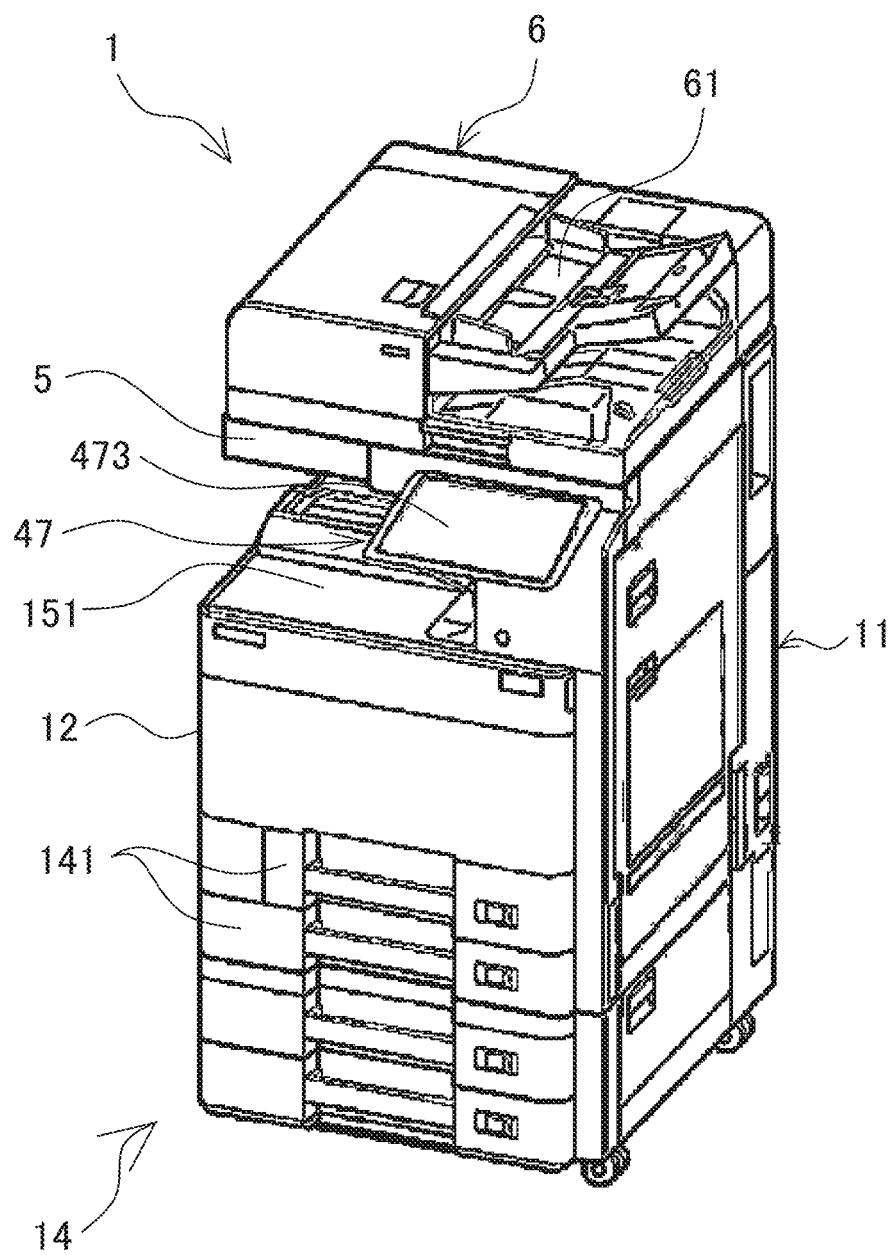
FIG. 1 is a perspective view showing an appearance of an image forming apparatus according to a first embodiment of an electronic device according to the present disclosure.
Figure 2:
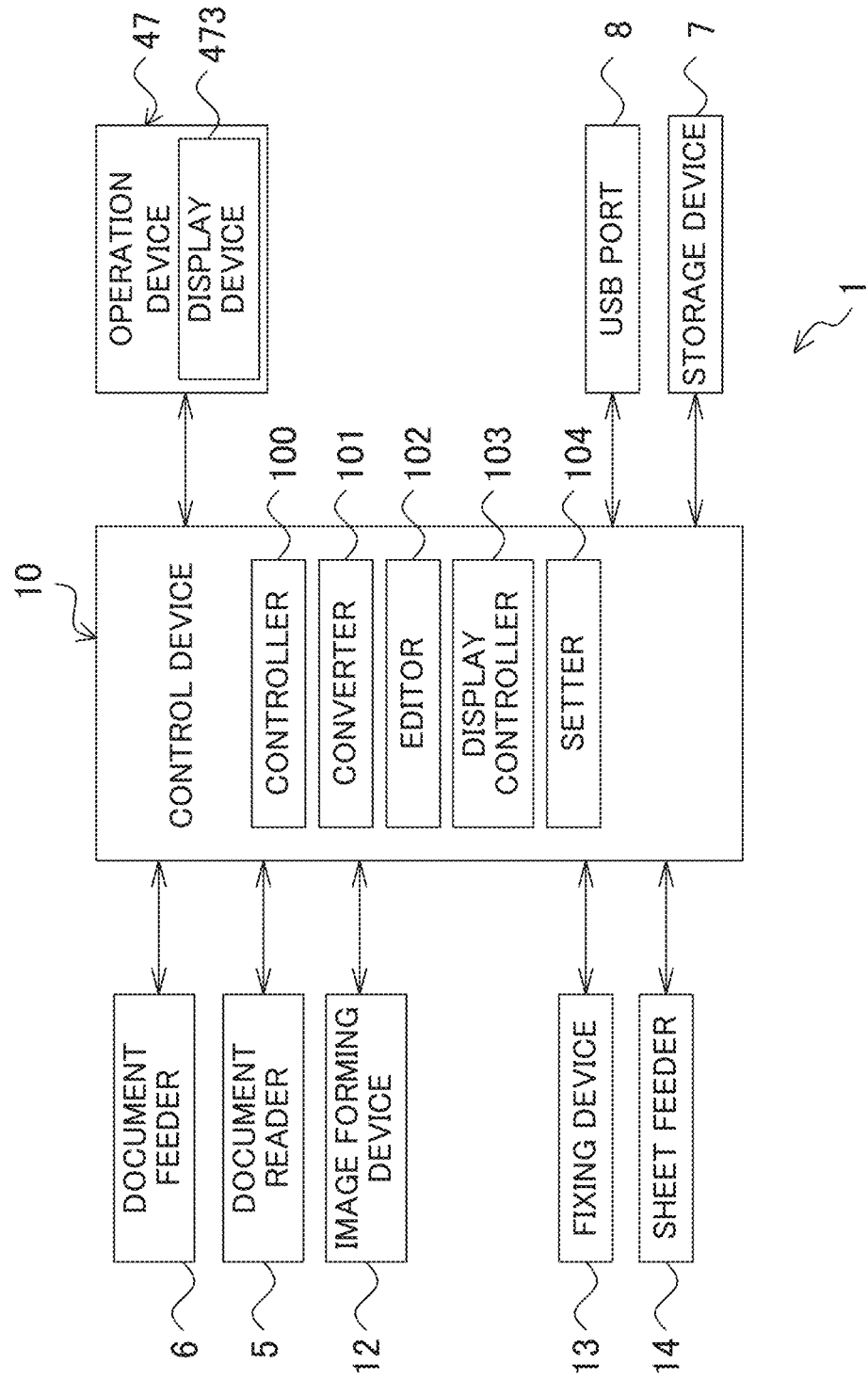
FIG. 2 is a functional block diagram schematically showing an essential internal configuration of the image forming apparatus according to the first embodiment.

Hereinafter, a description will be given of an image forming apparatus according to an embodiment of an electronic device according to the present disclosure with reference to the drawings. FIG. 1 is a perspective view showing an appearance of the image forming apparatus according to the first embodiment of the electronic device according to the present disclosure. FIG. 2 is a functional block diagram schematically showing an essential internal configuration of the image forming apparatus according to the first embodiment.

The image forming apparatus 1 is a multifunction peripheral having multiple functions including, for example, a copy function, a print function, a scan function, and a facsimile function. The image forming apparatus 1 is made up so that an apparatus body 11 contains a control device 10, a document feeder 6, a document reader 5, an image forming device 12, a fixing device 13, a sheet feeder 14, an operation device 47, a USB (universal serial bus) port 8, and a storage device 7.

The document feeder 6 is mounted by hinges or the like on a top surface of the document reader 5 and is thus openable and closable to the top surface of the document reader 5. The document feeder 6 functions as a document holder cover during reading of an original document placed on a platen glass. The document feeder 6 is referred to as an ADF (auto document feeder) or a DP (document processor). The document feeder 6 includes a document placement tray 61. The document feeder 6 feeds original documents placed on the document placement tray 61 sheet by sheet to the document reader 5.

A description will be given of the case where an original document reading operation is performed on the image forming apparatus 1. The document reader 5 optically reads an image of an original document fed to the document reader 5 by the document feeder 6 or an image of an original document placed on the platen glass and generates image data from the read image. The image data generated by the document reader 5 is saved in an image memory or the like.

Next, a description will be given of the case where an image forming operation is performed on the image forming apparatus 1. The image forming device 12 forms a toner image on a recording paper sheet fed from the sheet feeder 14 and serving as a recording medium, based on image data generated by the original document reading operation, image data stored in the image memory or the like, image data received from a network-connected computer, or other types of image data.

The fixing device 13 applies heat and pressure to the recording paper sheet on which the toner image has been formed by the image forming device 12, thus fixing the toner image on the recording paper sheet. The recording paper sheet subjected to this fixation processing is discharged to a sheet output tray 151. The sheet feeder 14 includes a plurality of sheet feed cassettes 141.

The operation device 47 includes a Start button, numeric keys, and respective keys corresponding to various instructions. The operation device 47 accepts, in response to operators' operations of the above keys, input of operators' instructions for various types of operations and processing executable by the image forming apparatus 1. The operation device 47 includes a display device 473 that displays operation guidance and other types of information for the operators. Furthermore, the operation device 47 accepts, through a touch panel included in the display device 473, input of operators' instructions based on operators' gestures (touch gestures) on an operation screen displayed on the display device 473.

The display device 473 includes an LCD (liquid crystal display) or the like. The display device 473 includes a touch panel. When an operator makes a touch gesture on a button or key displayed on the screen, the touch panel accepts an instruction associated with a location on the screen where the touch gesture has been made.

The USB port 8 is an interface where a USB memory can be connected. By inserting a USB memory into the USB port 8 to connect it to the USB port 8, the operator connects the USB memory to the control device 10. The control device 10 performs reading or writing of data from or to the USB memory thus connected.

The storage device 7 is a large storage device, such as an HDD (hard disk drive) or an SSD (solid state drive). The storage device 7 stores various types of control programs and so on.

The control device 10 includes a processor, a RAM (random access memory), a ROM (read only memory), and a dedicated hardware circuit. The processor is, for example, a CPU (central processing unit), an ASIC (application specific integrated circuit) or an MPU (micro processing unit).

When the above processor operates in accordance with a control program stored in the storage device 7, the control device 10 functions as a controller 100, a converter 101, an editor 102, a display controller 103, and a setter 104. Alternatively, each of the controller 100 and the other components of the control device 10 may not be implemented by the operation of the processor in accordance with the control program, but may be constituted by a hardware circuit. Hereinafter, the same applies to the other embodiments unless otherwise stated.

The controller 100 governs the overall operation control of the image forming apparatus 1. The controller 100 is connected to the document feeder 6, the document reader 5, the image forming device 12, the fixing device 13, the sheet feeder 14, the operation device 47, the USB port 8, and the storage device 7 and controls the motions, operations or the like of these components.

For example, the controller 100 controls the document reader 5 and so on to allow the document reader 5 to read an original document placed on the above-described DP (the document placement tray 61 of the document feeder 6) or an original document placed on the platen glass. The controller 100 creates a folder, arranges document images obtained by the reading by the document reader 5 in order of reading, stores them in this order into the created folder, and allows the storage device 7 to save the folder. In other words, the controller 100 stores the document images obtained by reading by the document reader 5 into the folder in chronological order.

The converter 101 converts the document images, which have been obtained by reading by the document reader 5 and arranged in chronological order, to a moving image in a predetermined format (for example, an AVI file format or an MP4 file format).

The editor 102 edits, according to an operator's editing instruction input to the operation device 47, each of the document images obtained by reading by the document reader 5.

The display controller 103 performs display control on the display device 473.

Figure 3:
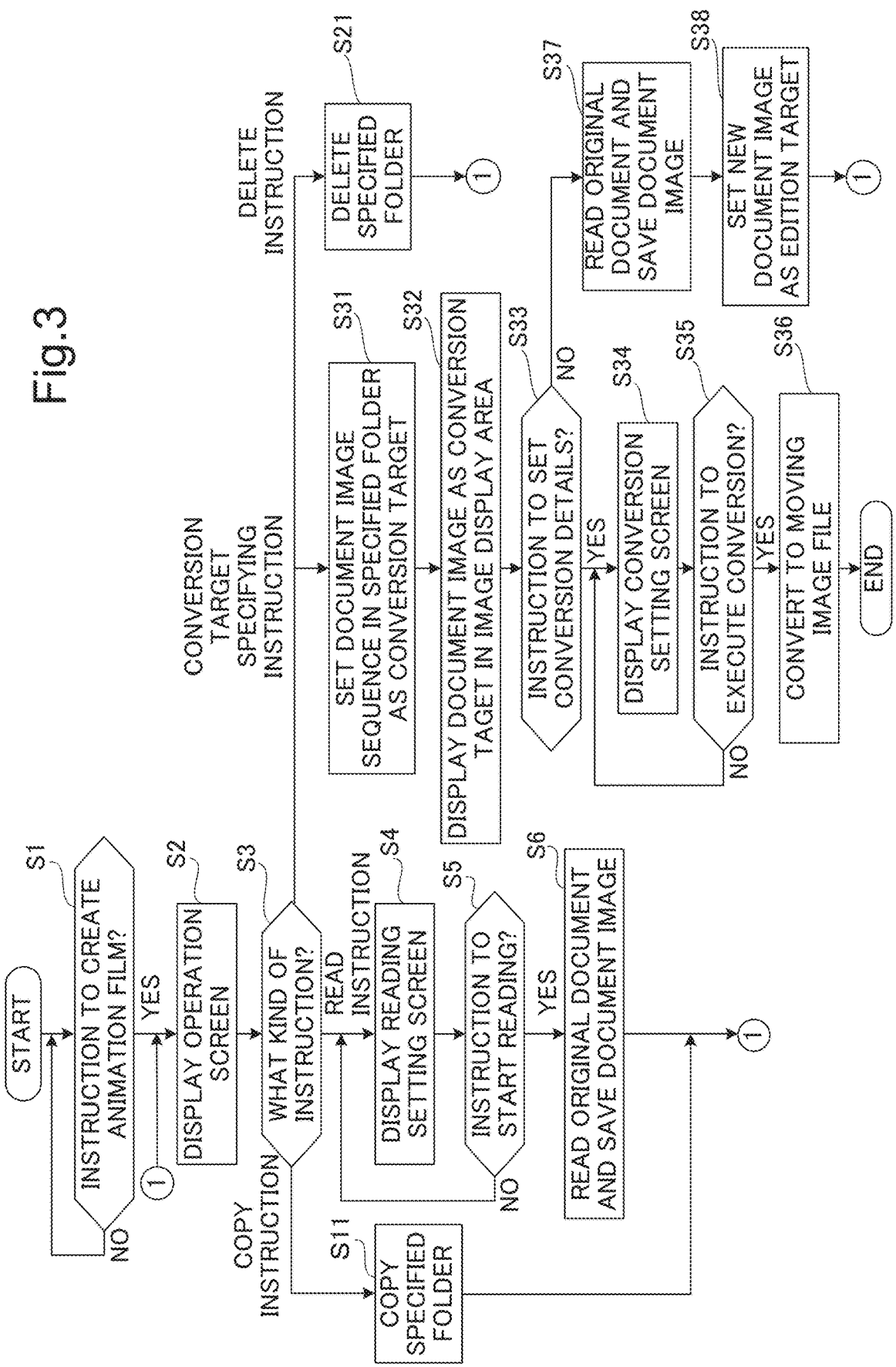
FIG. 3 is a flowchart showing processing for setting a document image sequence to be edited.
Figure 4:
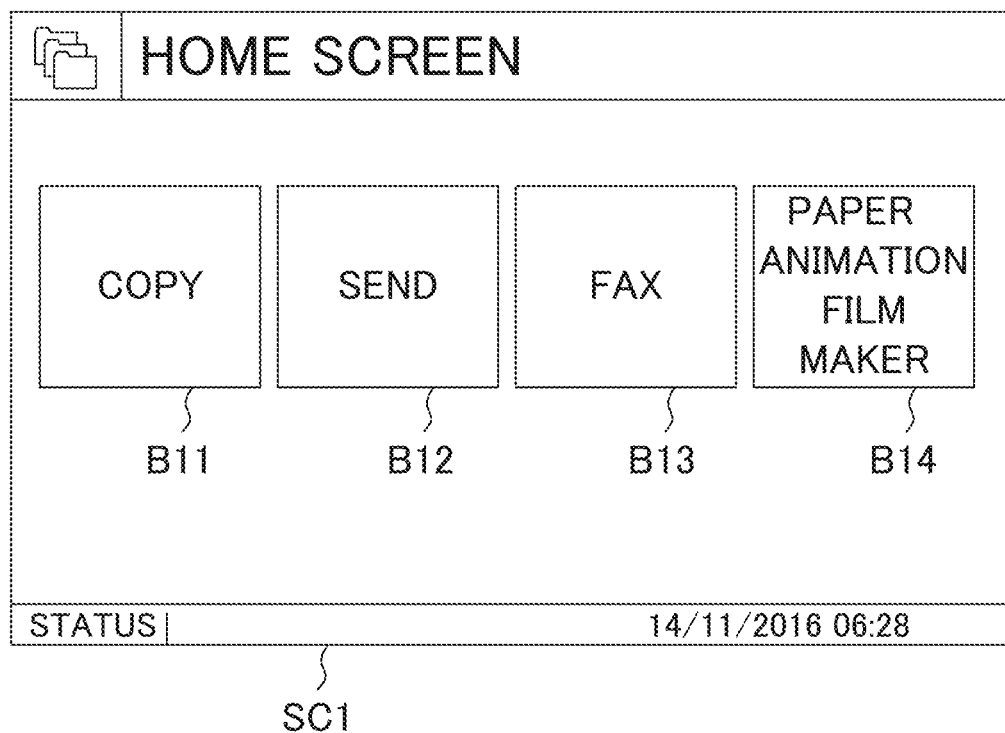
FIGS. 4 to 11B and FIGS. 13 to 17 are views showing examples of operation screens displayed on a display device.

Next, a description will be given of processing, on the image forming apparatus 1, for setting a document image sequence to be edited. FIG. 3 is a flowchart showing the processing for setting a document image sequence to be edited. FIG. 4 shows an operation screen SC1 which is a home screen for the image forming apparatus 1.

The display controller 103 allows the display device 473 to display the operation screen SC1. The title of the operation screen SC1 is "HOME SCREEN". The display controller 103 allows the display device 473 to display, on the operation screen SC1, an operation button B11 with "Copy" written as a function name thereon, an operation button B12 with "Send" written as a function name thereon, an operation button B13 with "Fax" written as a function name thereon, and an operation button B14 with "Paper Animation Film Maker" written as a function name thereon. The functions written on the operation buttons B11 to B13 are existing functions. The function written on the operation button B14 is a function as an embodiment of the present disclosure.

Figure 5:
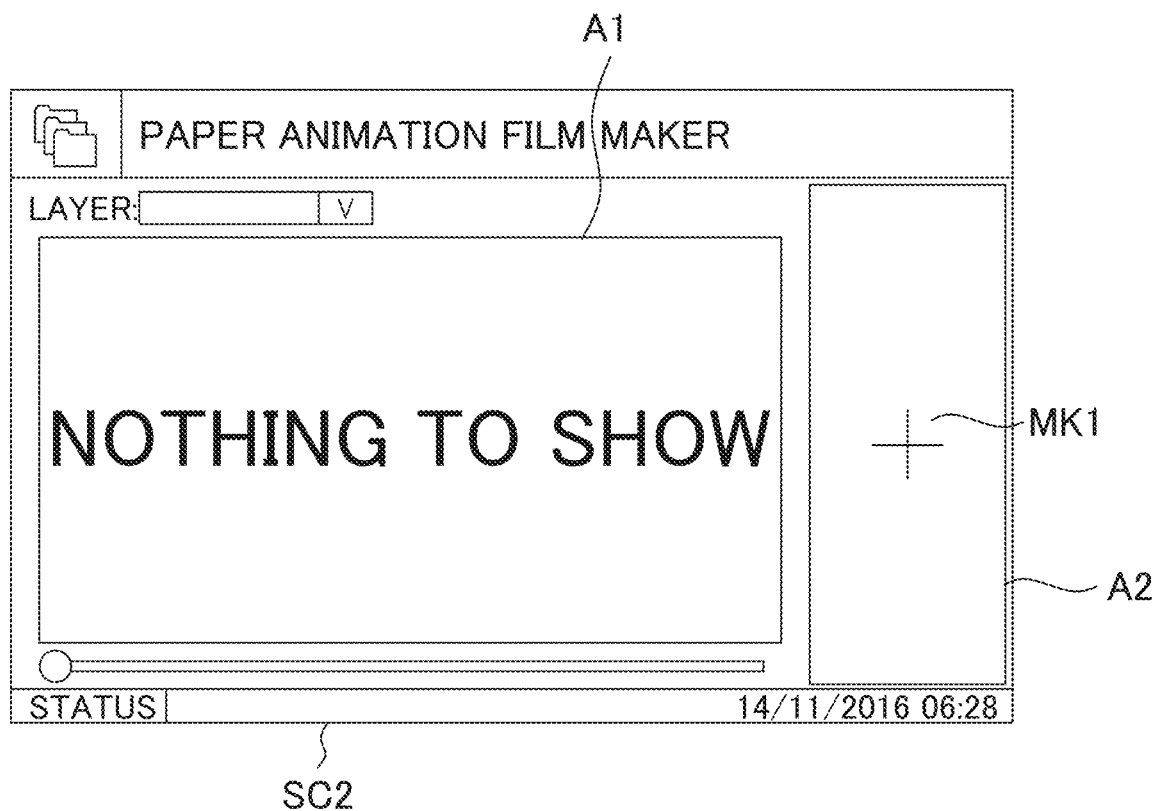

When an operator touches the operation button B14 on the operation screen SC1 displayed on the display device 473 and, thus, the operation device 47 accepts an instruction to create an animation film in response to the above touch gesture (YES in step S1), the display controller 103 allows the display device 473 to display an operation screen SC2 the title of which is "Paper Animation Film Maker", for example, like that shown in FIG. 5 (step S2).

The display controller 103 forms, on the operation screen SC2, an image display area A1 where a single document image corresponding to one frame of an animation film is to be displayed, and forms, lateral to the image display area A1, a folder area A2 where a folder for storing document images is to be displayed.

Note that, in FIG. 5, the display controller 103 allows no document image to be shown in the image display area A1, but allows a message "Nothing to show" to be shown in the image display area A1, and allows no folder to be shown in the folder area A2.

Figure 6:
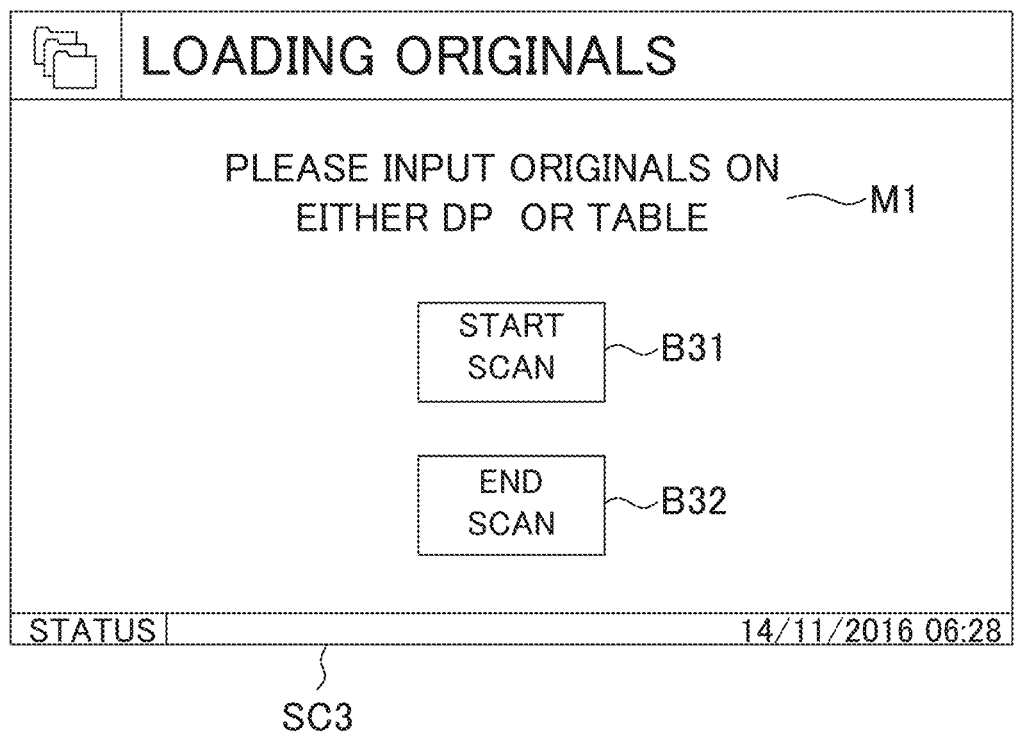

When the operator touches somewhere in the folder area A2 and, thus, the controller 100 accepts through the touch panel an instruction to read original documents ("READ INSTRUCTION" in step S3), the display controller 103 allows the display device 473 to display a reading setting screen SC3 the title of which is "LOADING ORIGINALS", like that shown in FIG. 6 (step S4).

The display controller 103 allows the reading setting screen SC3 to display a message M1 "Please input originals on either DP or table", an operation button B31 with "Start Scan" written thereon, and an operation button B32 with "End Scan" written thereon.

Suppose that, during display of the reading setting screen SC3, the operator touches the operation button B31 with "Start Scan" written thereon and the controller 100 accepts through the touch panel an instruction to start reading corresponding to the button B31 (YES in step S5). The controller 100 controls the document reader 5 and so on to perform processing for allowing the document reader 5 to read original documents placed on the DP (the document placement tray 61 of the document feeder 6) or an original document placed on the platen glass, creating a folder, storing document images obtained by reading by the document reader 5 into the created folder, and allowing the storage device 7 to save the folder (step S6).

In doing so, the controller 100 performs the above processing until the operator touches the operation button B32 with "End Scan" written thereon and, thus, the controller 100 accepts through the touch panel an instruction to terminate reading corresponding to the button B32. In storing the above document images obtained by reading by the document reader 5 into the folder, the controller 100 stores them, arranged in order of reading, into the folder. In other words, the controller 100 stores all the document images obtained by reading by the document reader 5, arranged in chronological order, into the folder and allows the storage device 7 to store the folder.

Figure 7A:
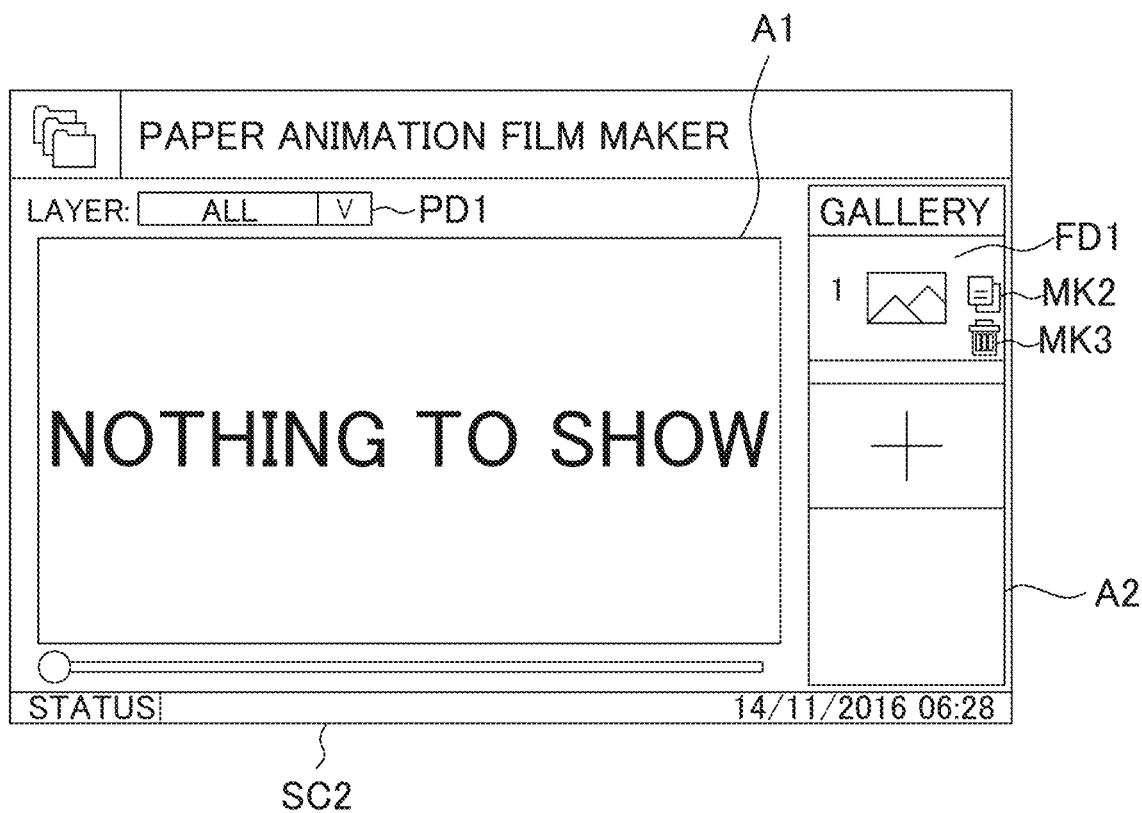

When terminating the above processing for storing the document images into the folder and allowing the storage device 7 to save the folder, the controller 100 returns processing to step S2. The display controller 103 allows the display device 473 to display the operation screen SC2 as shown in FIG. 7A (step S2). At this point in time, the controller 100 allows the display device 473 to display the operation screen SC2 where an image representing a folder FD1 with the document images stored therein is shown in the folder area A2. When a folder stored in the storage device 7 or a USB memory connected to the USB port 8 is specified by an operator's operation on the operation device 47, the controller 100 makes the specified folder a candidate for conversion processing by the converter 101 and the display controller 103 allows an image representing the specified folder to be further shown in the folder area A2.

Figure 7B:
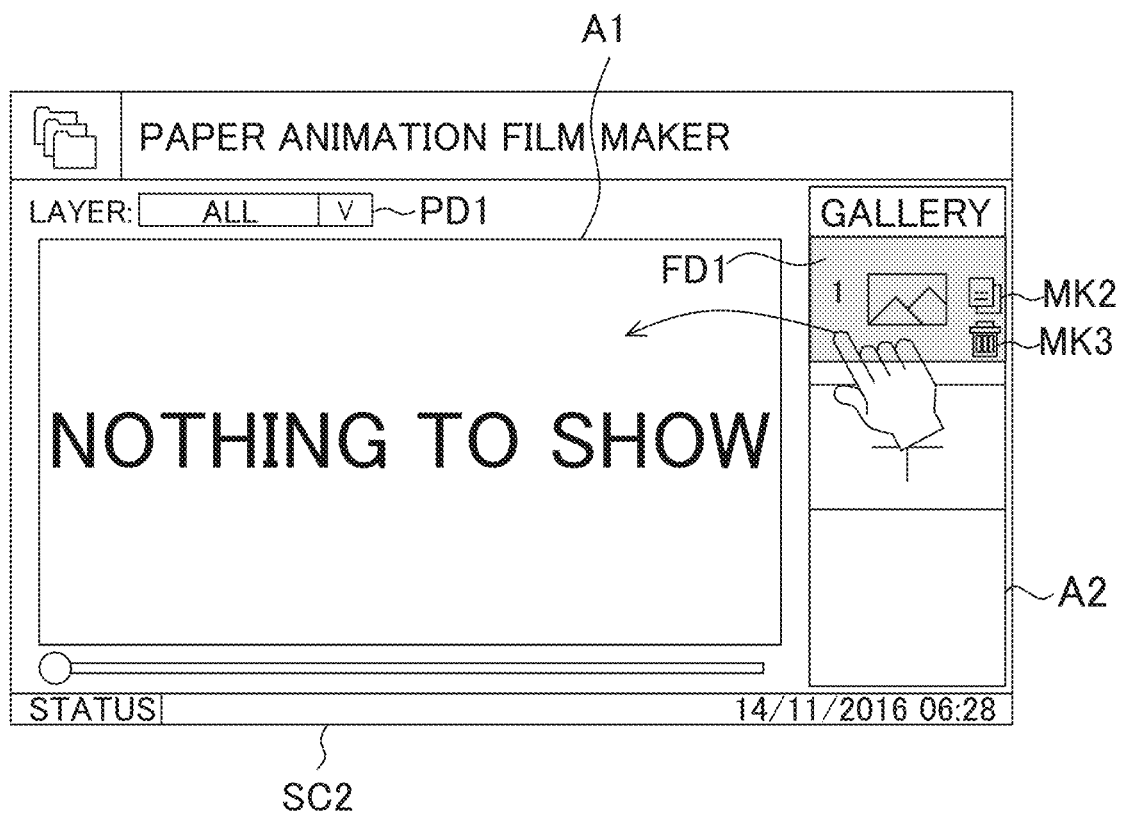

Suppose that while in step S2 the display controller 103 allows the display device 473 to display the operation screen SC2 as just described, the operator makes a drag and drop of the folder FD1 in the folder area A2 from the folder area A2 to the image display area A1 as shown in FIG. 7B and the editor 102 accepts through the touch panel an instruction to specify a target for conversion corresponding to the above drag and drop gesture ("CONVERSION TARGET SPECIFYING INSTRUCTION" in step S3). The editor 102 sets a document image sequence stored in the folder FD1 specified by the drag and drop gesture as a target for conversion by the converter 101 (step S31). At this time, as shown in FIG. 8, the display controller 103 allows the display device 473 to display an arbitrary document image forming one frame of the document image sequence (i.e., a document image corresponding to one frame of an animation film or a document image present at a location in chronological order corresponding to a display point of a slider SL to be described later) in the image display area A1 (step S32).

As shown in FIG. 7B, at the point in time when the folder FD1 is dragged and dropped as described above and, thus, the conversion target specifying instruction is accepted, the display controller 103 switches the background color of the folder FD1 shown in the folder area A2 to a different color, for example, "light green". Thus, simply by looking at the background color of the folder FD1 shown in the folder area A2, the operator can immediately recognize that the folder FD1 has been specified as a target for conversion.

Figure 8:
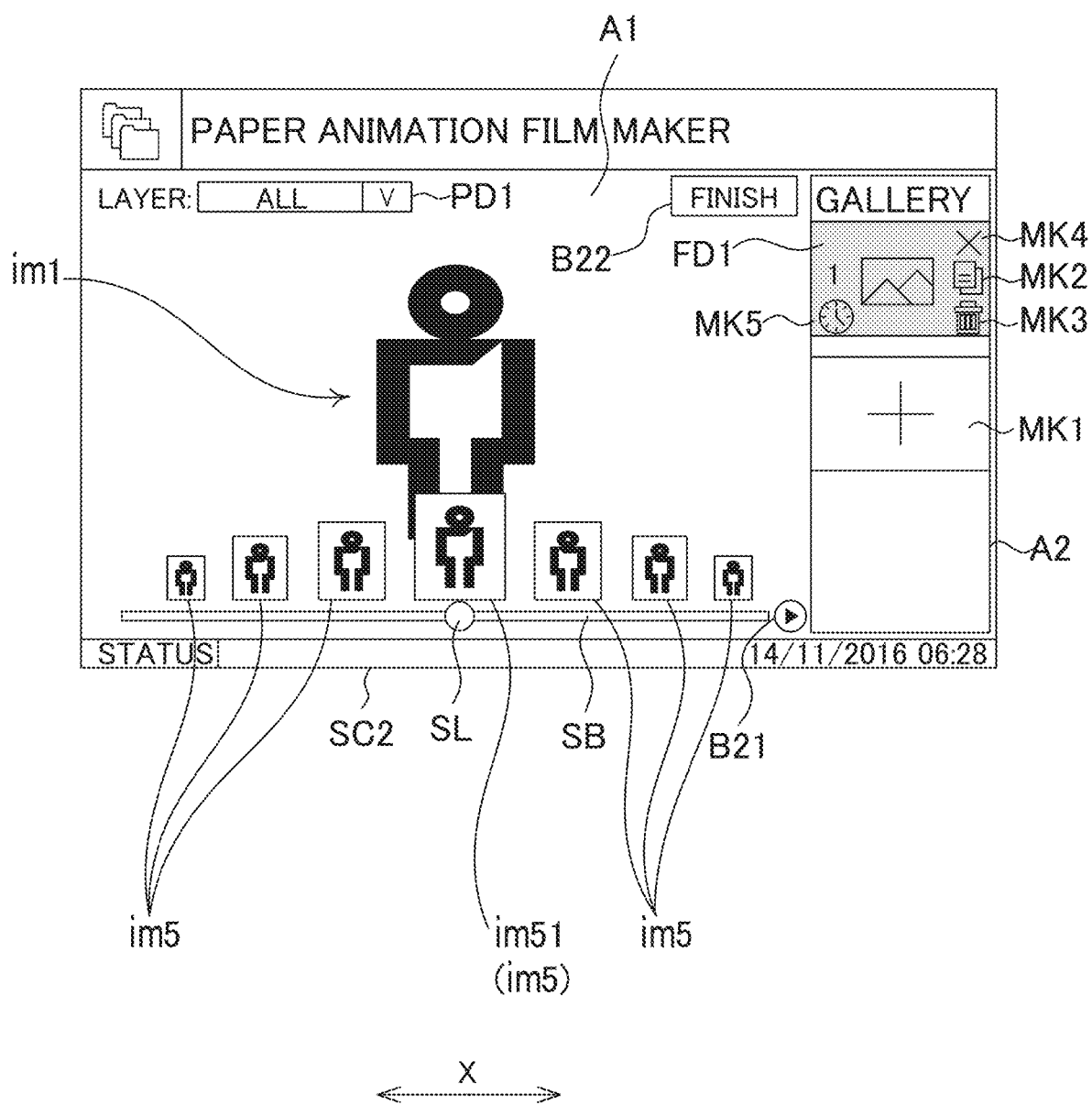
Figure 9:
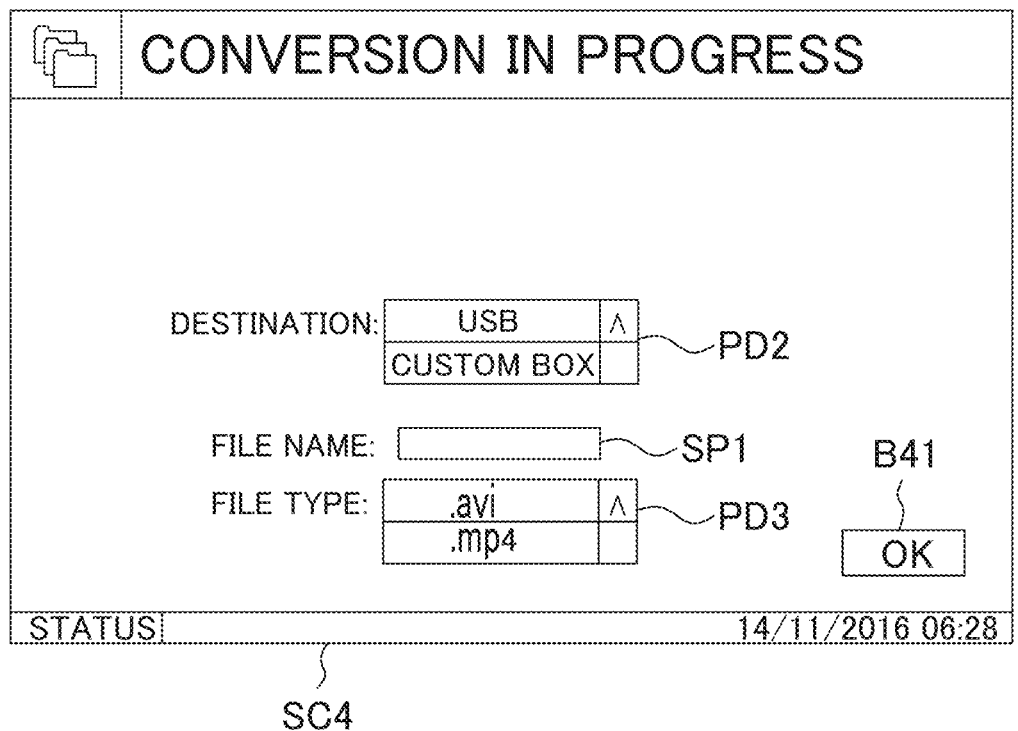

Furthermore, at this point in time, as shown in FIG. 8, the display controller 103 allows an operation button B22 with "Finish" written thereon to be displayed at the top right of the image display area A1. When the operator touches the operation button B22 and, thus, the controller 100 accepts through the touch panel a conversion details setting instruction corresponding to the operation button B22 (YES in step S33), the display controller 103 allows the display device 473 to display a conversion setting screen SC4 the title of which is "Conversion in Progress", like that shown in FIG. 9 (step S34).

The display controller 103 allows the display device 473 to display, on the conversion setting screen SC4, a pull-down menu PD2 showing selection items (for example, USB and custom box) for an output destination (Destination) of a moving image file obtained by conversion by the converter 101, an entry field SP1 where the name of the file (File Name) is to be entered, a pull-down menu PD3 showing selection items (for example, AVI file and MP4 file) for the format of the file (File Type), and an operation button B41 with "OK" written thereon. The pull-down menu PD2, the entry field SP1, the pull-down menu PD3, and the operation button B41 are images for use in accepting selections of an output destination and a file format from the operator.

When in this situation the operator touches the operation button B41 with "OK" written thereon and the controller 100 accepts through the touch panel a conversion executing instruction corresponding to the button B41 (YES in step S35), the converter 101 converts the document image sequence (document images arranged in chronological order and to be displayed in the image display area A1) set as a target for conversion in step S31 to a single moving image file (step S36). The controller 100 allows the storage device 7 to store the created moving image file. Then, the controller 100 ends the processing.

In doing so, in order that each document image is reproduced at a reproduction speed set by the setter 104 (or a predetermined set speed when the reproduction speed is not specified by the operator), the converter 101 converts all the document images forming the document image sequence set as a target for conversion in step S31 to a single moving image file in a file format selected by the operator.

Figure 10A:
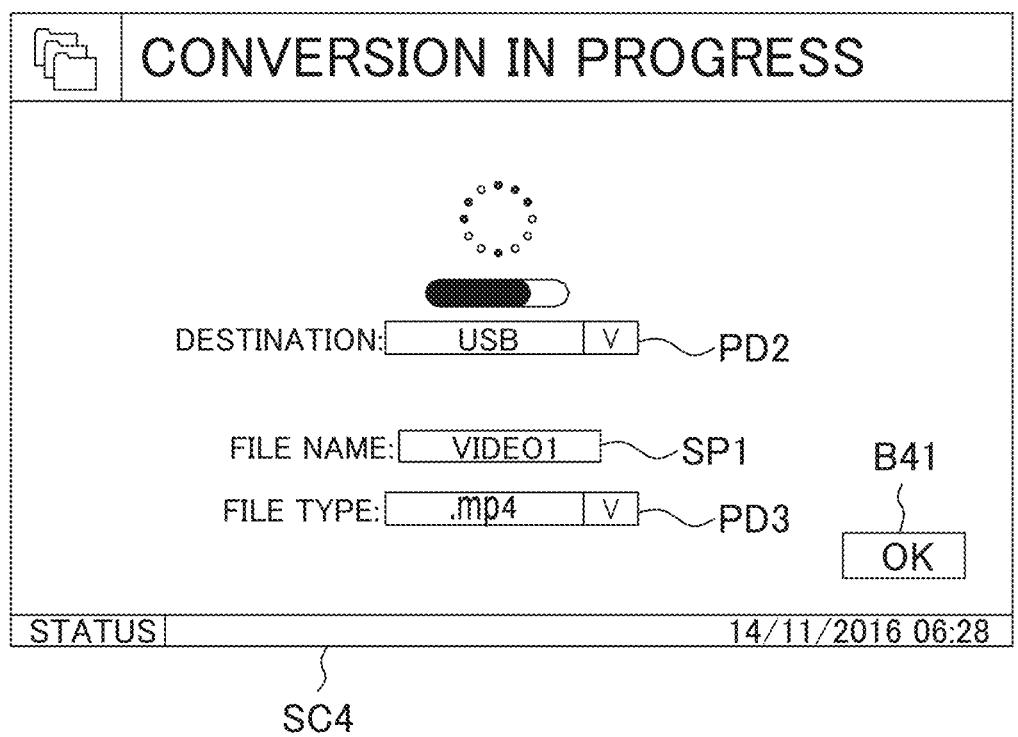
Figure 10B:

Next, a description will be given of a method for setting the details of conversion in converting a document image sequence to a moving file as described above. FIG. 10A shows a conversion setting screen SC4 displayed during conversion to a moving image file and FIG. 10B shows a conversion setting screen SC4 displayed after the completion of conversion to the moving file.

During display of the conversion setting screen SC4, the converter 101 and the controller 100 accept and set: an output destination of a moving image file selected by an operator's operation on the pull-down menu PD2; a file name input by an operator's operation on the entry field SP1 through the operation device 47; and a file format selected by an operator's operation on the pull-down menu PD3. FIGS. 10A and 10B show an example of a screen image displayed when "USB" has been selected as an output destination, "Video1" has been input as a file name, and ".mp4" has been selected as a file format.

When the output destination, the file name, and the file format have been set as just described, the converter 101 converts the above document image sequence to a moving image file in the set file format and gives the set file name to the moving image file obtained by the conversion. Upon completion of the conversion by the converter 101 from the document image sequence to the moving image file, the controller 100 outputs the moving image file obtained by conversion by the converter 101 through the USB port 8 to the USB memory connected to the USB port 8. Then, the processing ends.

In this manner, on the image forming apparatus 1, a document image sequence consisting of a plurality of document images obtained by reading by the document reader 5 is converted to a moving image file.

When, after step S31, the display controller 103 allows the display device 473 to display, in the image display area A1 on the operation screen SC2, document images of a document image sequence to be converted by the converter 101 (step S32), the display controller 103 allows a pull-down menu PD1 showing hierarchical items of a layer (Layer) to be displayed at the top left of the image display area A1 on the operation screen SC2 as shown in FIG. 8. The pull-down menu PD1 includes as menu items "All", "Upper Layer", and "Background Layer". This is a menu for accepting an operator's instruction to set a layer where document images are to be placed. In FIG. 8, the display controller 103 allows the display device 473 to display "All" only and hide "Upper Layer" and "Background Layer".

When the operator touches a symbol MK1 of a "+" sign on the operation screen SC2 and the controller 100 accepts through the touch panel a read instruction to read new document images corresponding to the symbol MK1 (NO in step S33), the controller 100 allows the document reader 5 to read new document images in accordance with the read instruction (step S37). In doing so, the controller 100 allows the storage device 7 to save the document images obtained by new reading by the document reader 5 (step S37).

Figure 11A:
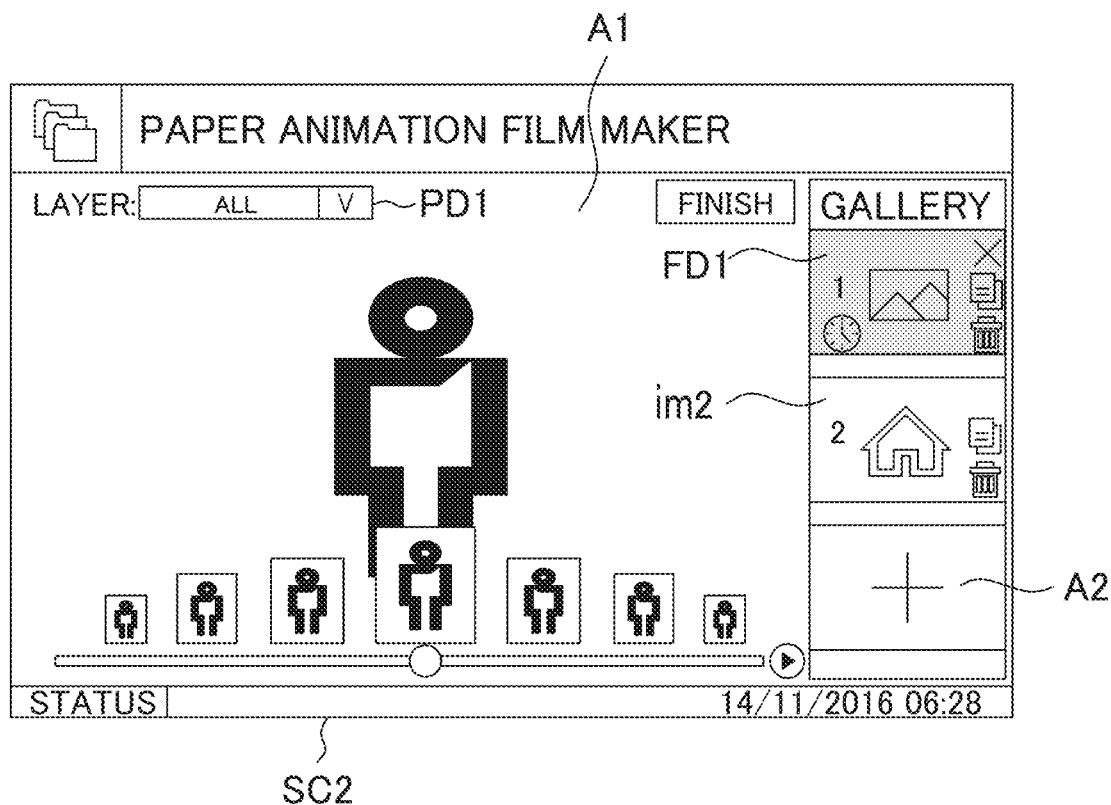

Upon completion of a series of processing steps for storing the document images into a folder and allowing the storage device 7 to save the folder, the controller 100 sets the document images obtained by the new reading (hereinafter, referred to as the "new document image(s)") as targets for edition (step S38). Thereafter, the controller 100 returns processing to step S2. For example, as shown in FIG. 11A, the display controller 103 allows a new document image im2 to be shown in tandem with the already shown folder FD1 in the folder area A2. In doing so, for example, the display controller 103 shows the background color of the folder FD1 in "light green" and shows the background color of the new document image im2 in "gray".

When, during display of the operation screen SC2 in step S32, a new document image im2 stored in the storage device 7 or the USB memory connected to the USB port 8 is specified by an operator's operation on the operation device 47, the display controller 103 sets, instead of the processing in steps S37 and S38, the new document image im2 as a target for edition and allows the display device 473 to display a folder for the new document image im2 in the folder area A2.

Furthermore, while the display controller 103 allows the display device 473 to display the operation screen SC2 in step S2, it allows the display device 473 to display, around a portion of the folder area A2 where the folder FD1 is shown, a symbol MK2 representing a "two-ply original documents" and a symbol MK3 representing a "trash box".

When in this situation the operator touches the symbol MK2 representing a "two-ply original documents" and, thus, the controller 100 accepts through the touch panel a copy instruction corresponding to the symbol MK2 ("COPY INSTRUCTION" in step S3), the controller 100 creates the same folder as the folder FD1 around which the symbol MK2 is displayed, and allows the storage device 7 to save the created folder (step S11). Therefore, the symbol MK2 serves as a copy button through which a copy instruction to copy an associated folder is input. Thereafter, the controller 100 returns processing to step S2.

On the other hand, when the operator touches the symbol MK3 representing a "trash box" and, thus, the controller 100 accepts through the touch panel a delete instruction corresponding to the symbol MK3 ("DELETE INSTRUCTION" in step S3), the controller 100 deletes the folder FD1 around which the symbol MK3 is displayed from the storage device 7 (step S21). Thus, the display controller 103 allows the display device 473 not to show an image representing the folder FD1 in the folder area A2. Therefore, the symbol MK3 serves as a delete button through which a delete instruction to delete an associated folder is input. Thereafter, the controller 100 returns processing to step S2.

Figure 12:
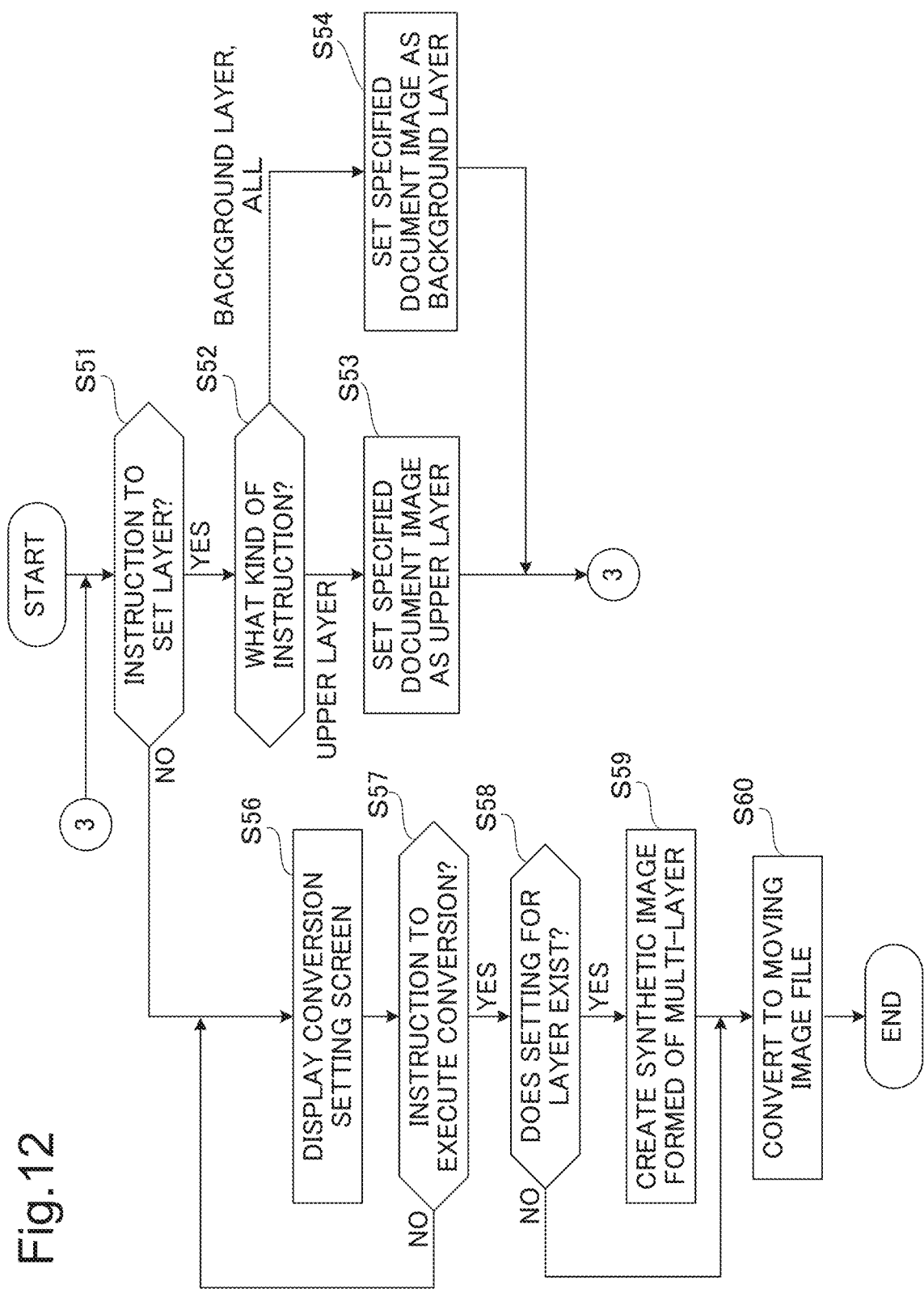
FIG. 12 is a flowchart showing edition processing on a document image sequence.

Next, a description will be given of edition processing that, on the image forming apparatus 1, the converter 101 performs on a document image sequence set as a target for conversion. FIG. 12 is a flowchart showing edition processing on a document image sequence. The edition processing is executed when, during display of the operation screen SC2 in step S32 in the flowchart shown in FIG. 3, an instruction based on an operator's operation on the pull-down menu PD1 is input to the operation device 47.

Suppose that while, during display of the operation screen SC2 in step S32 in the flowchart shown in FIG. 3, "Upper Layer" is selected as a layer by an operator's operation on the pull-down menu PD1, the operator makes a drag and drop of the new document image im2 from the folder area A2 to the image display area A1 and the editor 102 accepts through the touch panel an instruction to set an upper layer corresponding to the above drag and drop gesture (YES in step S51 and "UPPER LAYER" in step S52). The editor 102 sets the new document image im2 as an upper layer for each of all the document images set as targets for conversion by the converter 101 at this point in time (step S53). Thereafter, the editor 102 returns processing to step S51.

Alternatively, suppose that while "Background Layer" is selected as a layer by an operator's operation on the pull-down menu PD1, the operator makes a drag and drop of the new document image im2 from the folder area A2 to the image display area A1 and the editor 102 accepts through the touch panel an instruction to set a background layer corresponding to the above drag and drop gesture (YES in step S51 and "BACKGROUND LAYER" in step S52). The editor 102 sets the new document image im2 as a background layer for each of all the document images set as targets for conversion by the converter 101 at this point in time (step S54). Thereafter, the editor 102 returns processing to step S51.

Still alternatively, suppose that also when, with "All" selected as a layer by an operator's operation on the pull-down menu PD1, the operator makes a drag and drop of the new document image im2 from the folder area A2 to the image display area A1, the editor 102 accepts through the touch panel an instruction to set a background layer as an instruction corresponding to the above drag and drop gesture (YES in step S51 and "ALL" in step S52). Also in this case, the editor 102 sets the new document image im2 as a background layer for each of all the document images set as targets for conversion by the converter 101 at this point in time (step S54). Thereafter, the editor 102 returns processing to step S51.

Figure 11B:
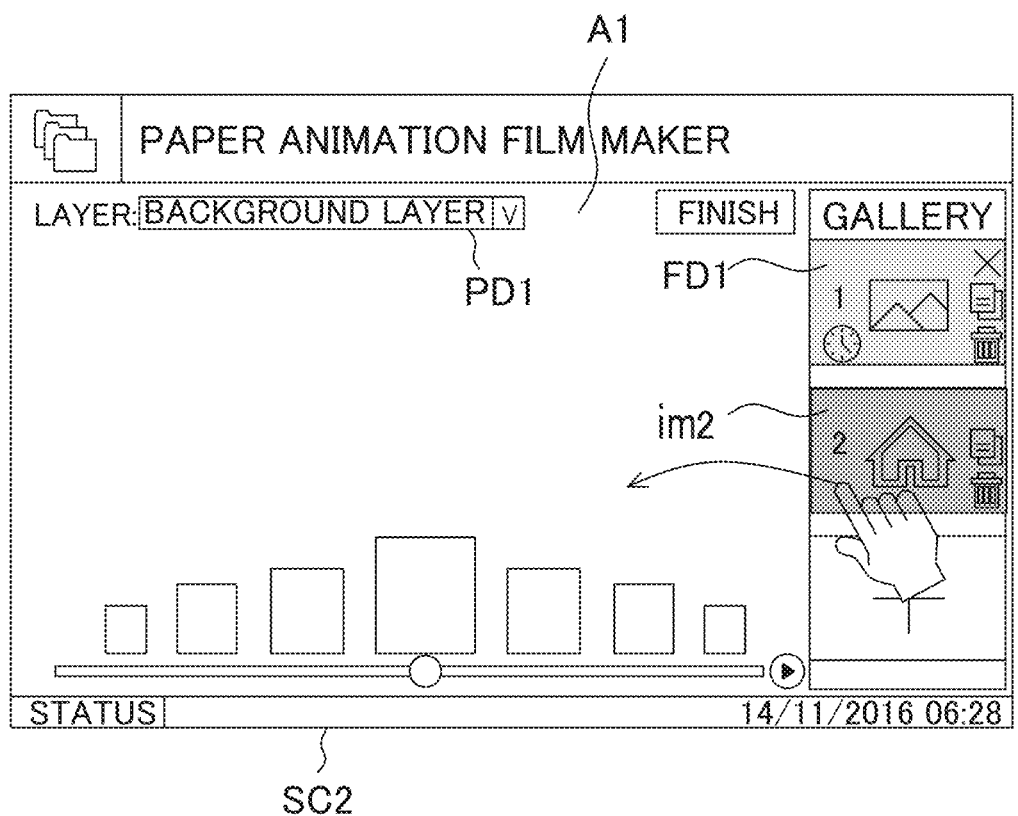
Figure 13:
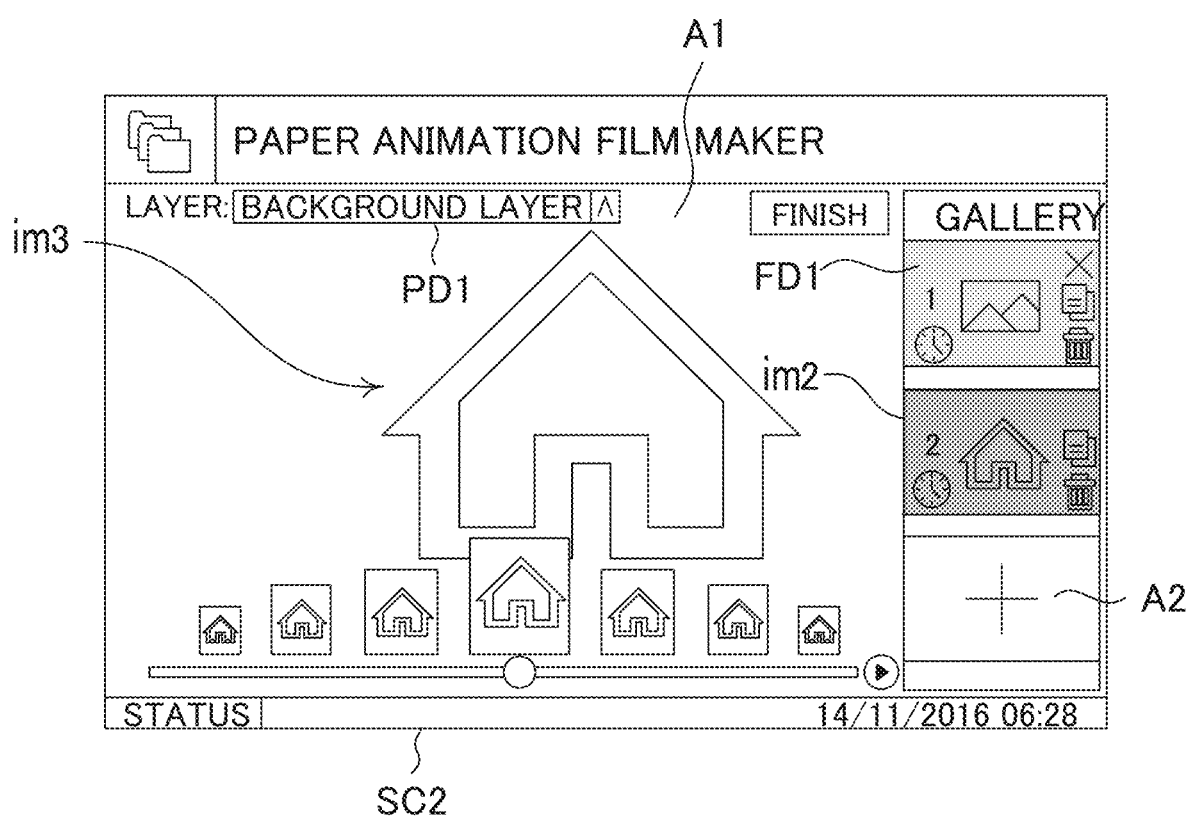

In this embodiment, while "Background Layer" is selected for Layer in the pull-down menu PD1, the display controller 103 allows an image set as a background layer to be displayed in the image display area A1. FIG. 11B shows a display state of the image display area A1 when no image is set as a background layer. As seen from the above, when, after the editor 102 sets the new document image im2 as a background layer, "Background Layer" is selected for Layer by an operator's operation on the pull-down menu PD1, the display controller 103 allows a document image im3 serving as a background layer to be displayed in the image display area A1 as shown in FIG. 13. When the new document image im2 is subjected to a drag-and-drop operation from the folder area A2 to the image display area A1, the display controller 103, at this point in time, switches the background color of the new document image im2 to "light orange color" as shown in FIG. 11B.

While "Upper Layer" is selected for Layer by an operator's operation on the pull-down menu PD1, the display controller 103 allows an image set as an upper layer to be displayed in the image display area A1. At this point in time, the display controller 103 allows the display device 473 to display as an upper layer a document image of the document image sequence set as a target for conversion. When the new document image im2 is subjected to a drag-and-drop operation from the folder area A2 to the image display area A1, the display controller 103, at a point in time, switches the background color of the new document image im2 to "light green".

As thus far described, the background color of the new document image im2 when used as a background layer is "light orange color", whereas the background color of the new document image im2 when used as an upper layer is "light green". Thus, based on differences in background color, the operator can recognize whether each folder is used as an upper layer or a background layer.

Figure 14:
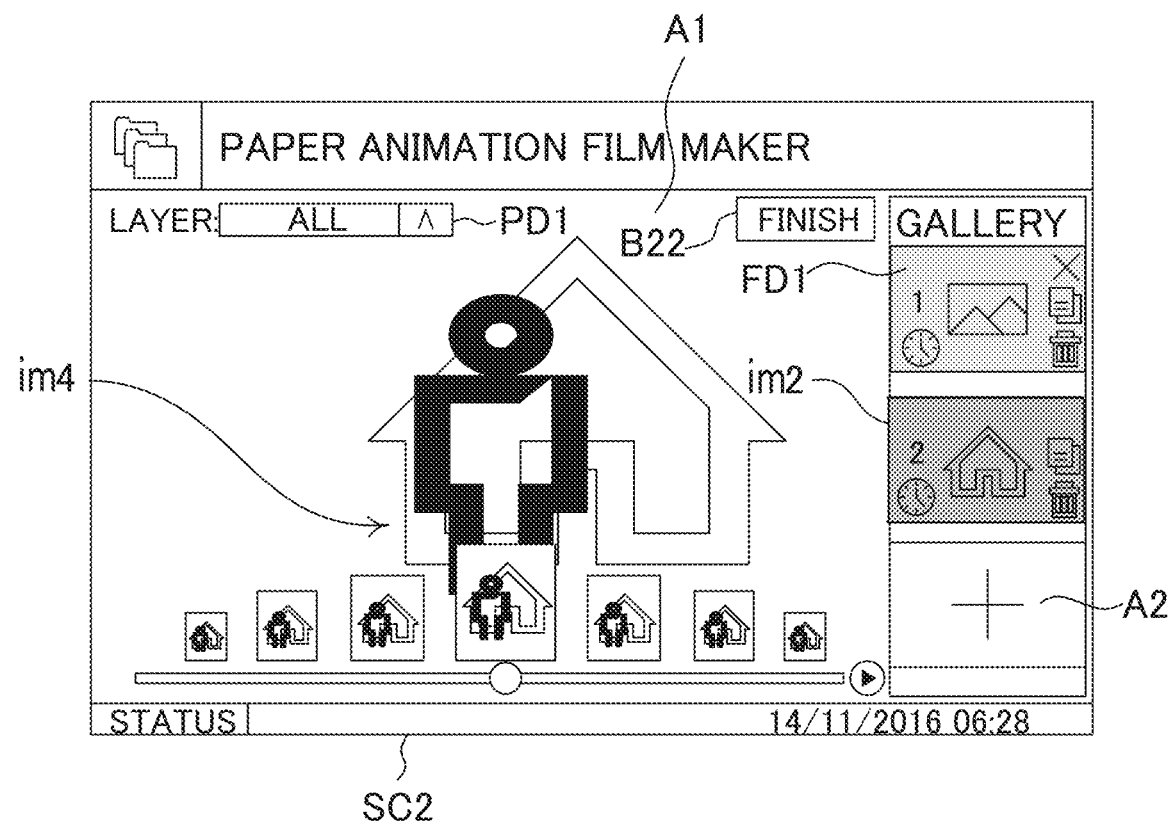

When in the above situation "All" is selected for Layer by an operator's operation on the pull-down menu PD1, the display controller 103 allows an image im4 obtained by overlaying a document image placed in the upper layer on a document image placed in the background layer to be displayed in the image display area A1 as shown in FIG. 14. For example, the display controller 103 allows the image im4 to be displayed as an image showing a state where the document image placed in the background layer is seen through the document image placed in the upper layer.

While the display controller 103 allows a document image of a document image sequence as a target for conversion by the converter 101 to be displayed in the image display area A1 on the operation screen SC2 (step S32 in FIG. 3), the display controller 103 allows the display device 473 to display, at the top right of the image display area A1, the operation button B22 with "Finish" written thereon. When in this state the operator touches the operation button B22 in step S51 and the controller 100 accepts an instruction to switch the screen in response to the touch gesture (NO in step S51), the display controller 103 allows the display device 473 to display the conversion setting screen SC4 (step S56).

When during display of the conversion setting screen SC4 the operator touches the operation button B41 with "OK" written thereon and the controller 100 accepts through the touch panel a conversion instruction corresponding to the touch gesture on the operation button G41 (YES in step S57) and the editor 102 determines that a setting for the layer exists at this point in time (YES in step S58), the editor 102 creates a synthetic image formed of a multi-layer having a structure in which a document image set as an upper layer (higher layer) at this point in time is overlaid on a document image set as a background layer (underlying layer) at this point in time (step S59). When the editor 102 determines that no setting for the layer exists at this point in time (NO in step S58), the editor 102 does not create a synthetic image and moves processing to step S60.

Thereafter, the converter 101 treats the synthetic image created by the editor 102 as one document image forming part of the document image sequence to be converted to a moving image and converts the document image sequence set as a target for conversion at this point in time to a moving image (step S60). Then, the converter 101 ends the processing.

Next, a further description will be given of the display in the image display area A1 on the operation screen SC2.

While the display controller 103 allows the display device 473 to display a document image stored in the folder FD1 and set as a target for conversion by the converter 101 in the image display area A1 in the processing in step S31 shown in FIG. 3, it allows the display device 473 to display, around the portion of the folder area A2 where the folder FD1 is shown, a symbol MK4 of a "x" sign and a symbol MK5 representing a "clock" as shown in FIG. 8. The display controller 103 allows the display device 473 to display the operation button B21 for use in accepting an instruction to continuously reproduce the document images stored in the folder FD1, lateral to a scroll bar SB and a slider SL displayed at the bottom of the image display area A1 (on the right side of the scroll bar SB in FIG. 8).

When the operator touches the operation button B21 and, thus, the controller 100 accepts through the touch panel an instruction corresponding to the operation button B21, the display controller 103 allows the document images as targets for conversion to be continuously reproduced in chronological order on the display device 473.

When the operator makes a slide gesture in the direction x of the image display area A1 on the slider SL, the display controller 103 allows the display device 473 to display the slider SL to move a display position of the slider SL in the direction x according to the slide gesture. In doing so, the display controller 103 allows the display device 473 to display the slider SL at a point of touch (a point in the direction x in the image display area A1) with an operator's finger moving according to the slide gesture.

The display controller 103 allows, for example, a RAM to store the respective display positions of the slider SL and the respective locations of the document images arranged in chronological order in association with each other. When the operator makes a slide gesture on the slider SL, the display controller 103 allows the display device 473 to display a document image located at a chronological location associated with a display position of the slider SL being displayed while moving according to the slide gesture as a large image im1 in the image display area A1.

When the operator makes a slide gesture on the slider SL and the controller 100 accepts through the touch panel an instruction corresponding to the slide gesture, the display controller 103 sequentially detects respective document images located at respective chronological locations associated with the respective display positions of the slider SL being displayed while moving according to the slide gesture and sequentially changes the document image being displayed as the large image im1 in the image display area A1 to the next document image detected.

The display controller 103 picks up a predetermined number of (seven in this case) other document images being not displayed as a large image im1 in the image display area A1 and allows the display device 473 to display the picked document images as minified images im5 in chronological order on the operation screen SC2 as shown in FIG. 8. When the operator makes a slide gesture on the slider SL, the display controller 103 allows the display device 473 to display a minified image im5 located at the chronological location associated with the display position (the above-mentioned point of touch) of the slider SL being displayed while moving according to the slide gesture, as a minified image im51 of greater size than the minified images im5 of the other document images being displayed in the image display area A1. Therefore, the display controller 103 allows the document image displayed as a minified image im51 of greater size to be also displayed as a large image im1 in the image display area A1.

In accordance with an operator's operation through the operation device 47, the editor 102 performs, as the above-described edition processing, deletion processing for deleting a document image being displayed as a large image im1 in the image display area A1. For example, when the operator touches the symbol MK4 of a "x" sign and the controller 100 accepts through the touch panel an instruction corresponding to the symbol MK4, the editor 102 performs deletion processing for deleting the document image being displayed as a large image im1 in the image display area A1 from targets for conversion. When the above deletion processing is performed by the editor 102, the display controller 103 allows the display device 473 not to display the above document image in the image display area A1. In other words, the deleted document image is excluded from the targets for subsequent conversion processing by the converter 101 and is therefore not contained in a moving image file to be created later.

Figure 15A:
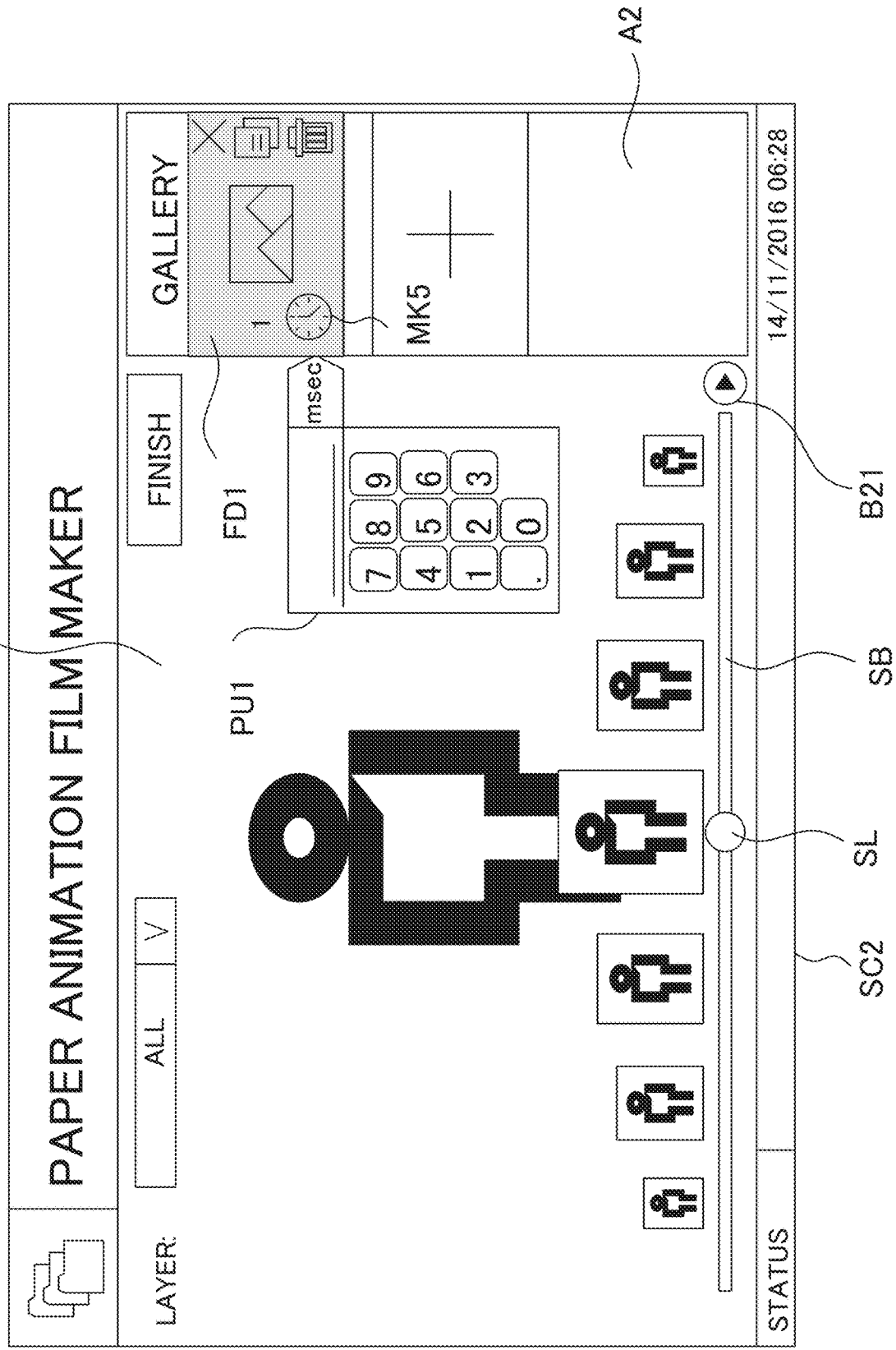

Next, a description will be given of the setting of the reproduction speed for document images forming a document image sequence to be converted. The setter 104 sets the reproduction speed for the document images forming the document image sequence (the display time (reproduction time) per frame in this case) in accordance with an operator's speed setting instruction input to the operation device 47. For example, when the operator touches the symbol MK5 representing a "clock" shown in FIG. 8 and the controller 100 accepts through the touch panel an instruction corresponding to the symbol MK5, the display controller 103 allows the display device 473 to display on the operation screen SC2 a speed setting screen PU1 through which the reproduction speed is to be set as shown in FIG. 15A. The display controller 103 allows numeral keys to be displayed on the speed setting screen PU1. The numeral keys are button images through which a specification of the reproduction speed from the operator is input.

The setter 104 sets the reproduction speed specified by operator's pressing of numeral keys on the speed setting screen PU1 and accepted through the touch panel, as a display time for a document image (frame) being displayed as a large image im1 at this point in time. FIG. 15B shows an example of display when the display time per frame has been specified to be "200 msec". The description in this embodiment is given of the case where the setter 104 sets the display time per frame as the reproduction speed for document images. However, in another embodiment, the setter 104 may set the time specified by operator's pressing of numeral keys on the speed setting screen PU1 to the total reproduction time for all the document images to be converted by the converter 101 and set a value obtained by dividing the total reproduction time by the total number of the document images as the display time per frame.

Next, a description will be given of processing for adding a document image. For example, when the operator touches the symbol MK1 of a "+" sign on the operation screen SC2 shown in FIG. 8 and the controller 100 accepts through the touch panel an instruction to read a new document image corresponding to the symbol MK1, the controller 100 allows the document reader 5 to read a new document image. The controller 100 allows the storage device 7 to save the new document image obtained by reading by the document reader 5.

Figure 16A:
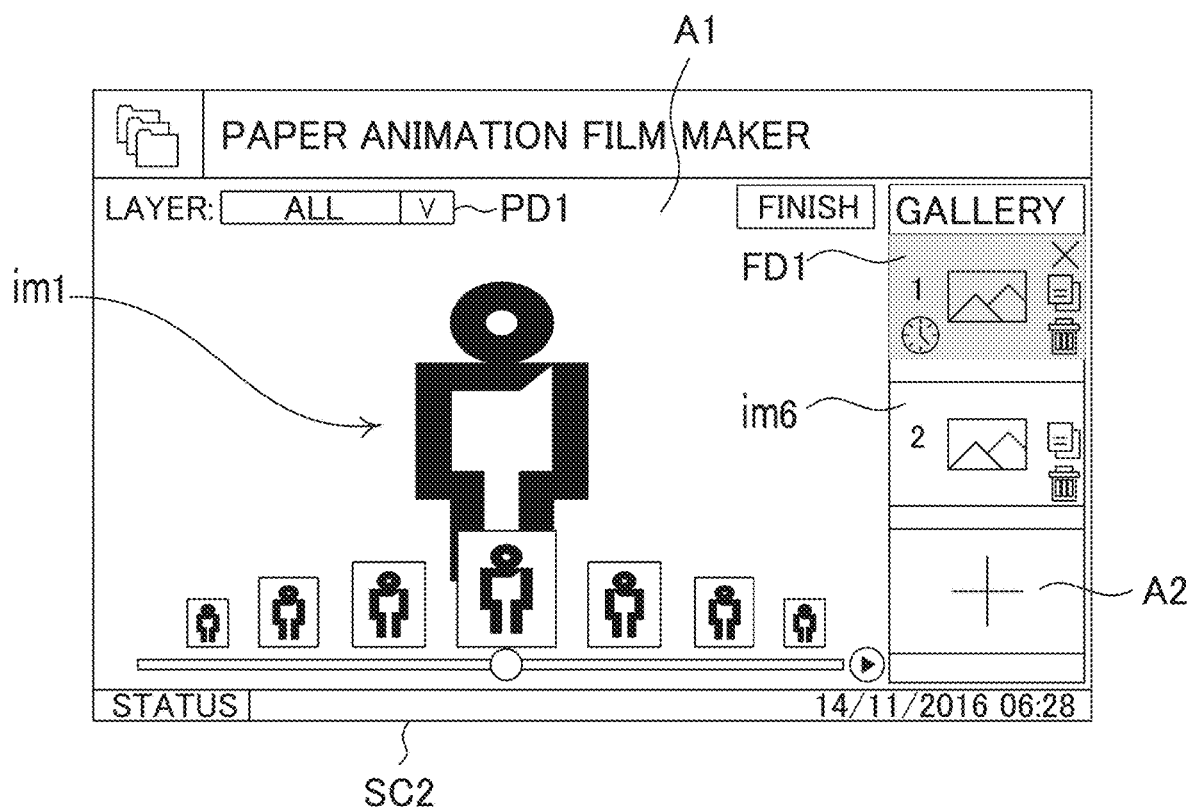

When the controller 100 terminates the processing for allowing the storage device 7 to save the new document image, the display controller 103 allows the new document image im6 to be displayed, for example, as shown in FIG. 16A, in tandem with an image representing the folder FD1 in the folder area A2. In doing so, for example, the display controller 103 shows the background color of the new document image im6 in "light green" and shows the background color of the folder FD1 in "gray".

Figure 16B:
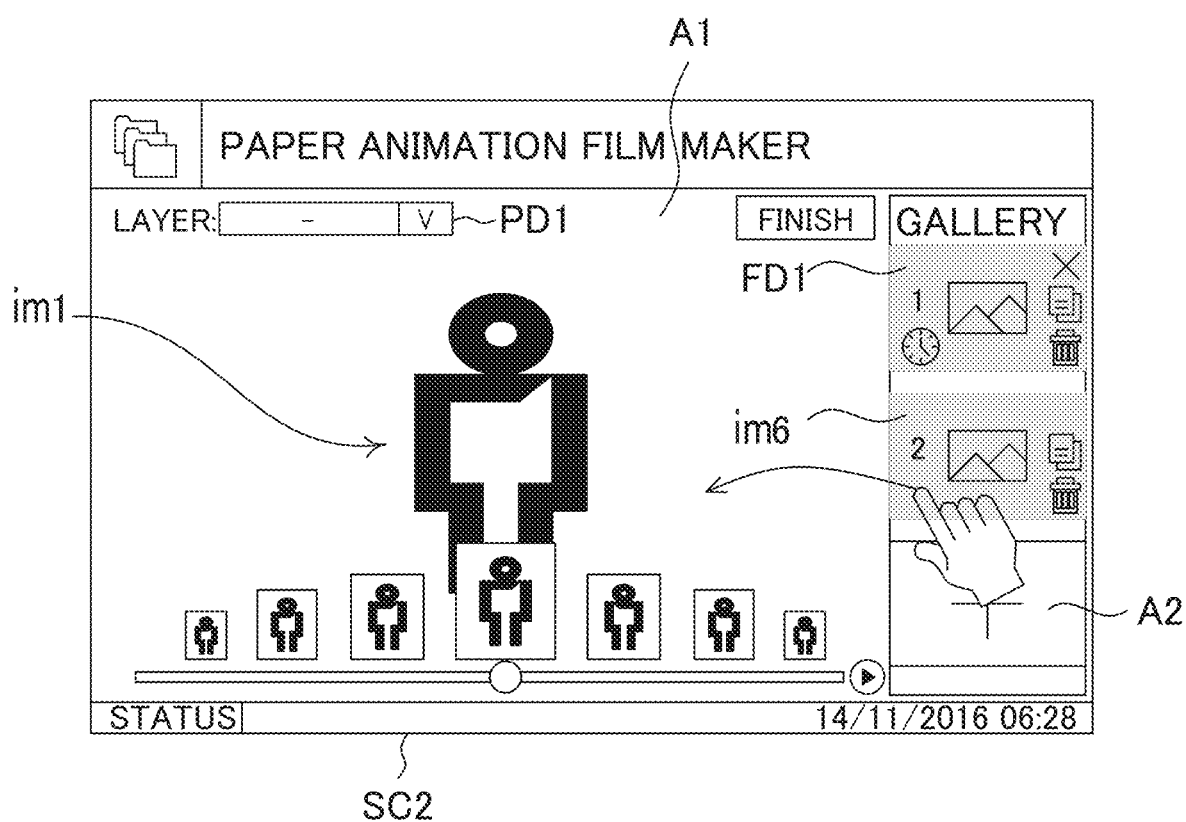
Figure 17:
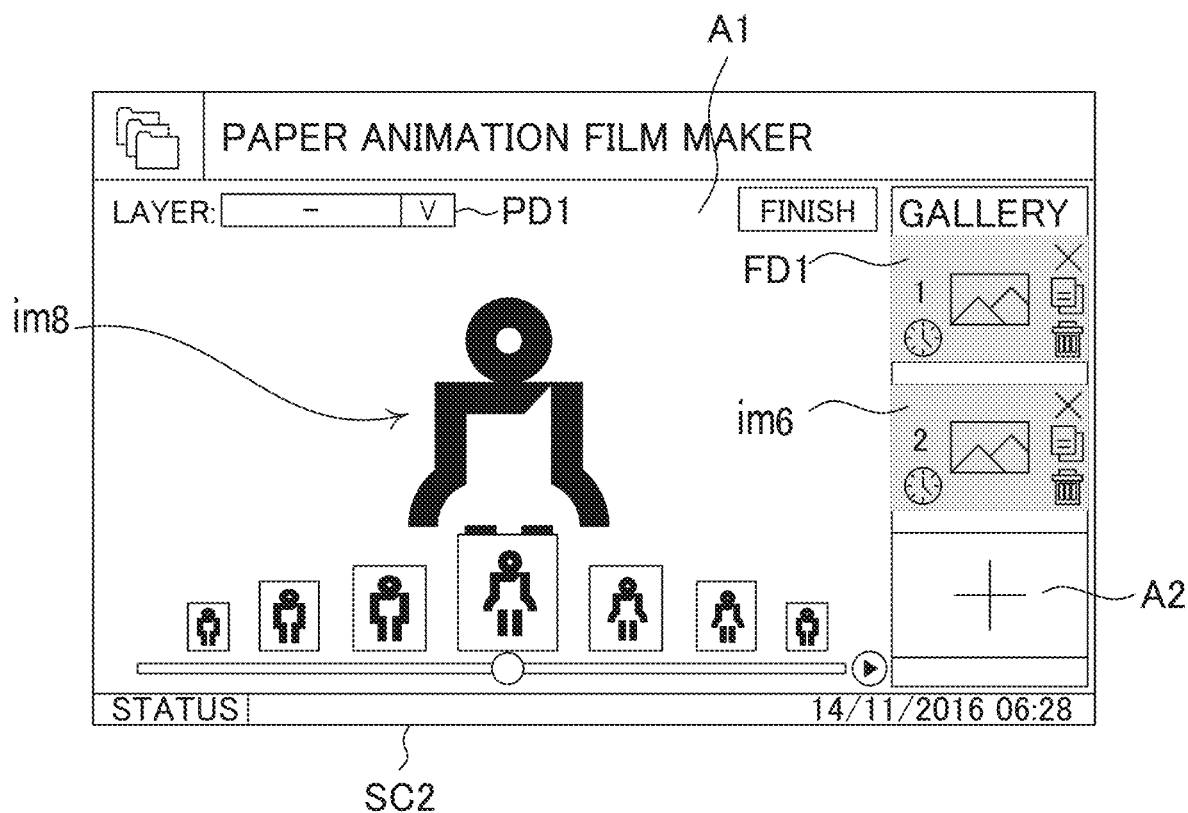

Suppose that, as shown in FIG. 16B, while the item for Layer is put into an unselected state by an operator's operation on the pull-down menu PD1, the operator makes a drag and drop of the new document image im6 being displayed in the folder area A2 from the folder area A2 to the image display area A1 and the editor 102 accepts through the touch panel an image addition instruction corresponding to the above drag and drop gesture. The editor 102 adds, to the document image sequence set as a target for conversion by the converter 101 at this point in time, the new document image im6 as one document image to be converted, just after the document image being displayed as a large image im1 in the image display area A1. After the addition, as shown in FIG. 17, the display controller 103 allows the newly added document image im6 to be displayed, as a large image im8 in place of the large image im6 having been displayed until just before, in the image display area A1. FIG. 17 shows the operation screen SC2 displayed when the new document image im6 is added multiple times.

When a new document image is dragged and dropped, the display controller 103, at this point in time, switches the background color of the new document image to "light green" as shown in FIG. 16B.

In the meantime, an electronic device, such as a copier or a multifunction peripheral, includes a document reader that reads an image of an original document. If document images obtained by reading by the document reader can be continuously displayed, a slide show and an animation can be implemented. However, such an electronic device with a document reader does not have the function of editing images and, therefore, cannot create a moving image giving a high degree of satisfaction to the operator. Furthermore, even if the electronic device has the editing function, the operator is required to perform a high level of editing operation.

In contrast, in the first embodiment, document images can be edited by making one frame document image being displayed in the image display area A1 (one of the document images to be converted) a target for edition. Furthermore, by performing the above-described deletion and addition processing, document images to be converted can be replaced. Thus, the edition of document images forming a document image sequence to be converted can be performed in frames and a plurality of layers can be set for the document images to be converted. Therefore, a moving image giving a high degree of satisfaction to the operator can be easily created. In addition, in the first embodiment, since the above edition processing and the processing for creating a moving image file can be seamlessly performed after the reading of original documents for the purpose of obtaining document images as materials for a moving image file, a moving image file can be easily created from paper-based original documents.

Figure 18:
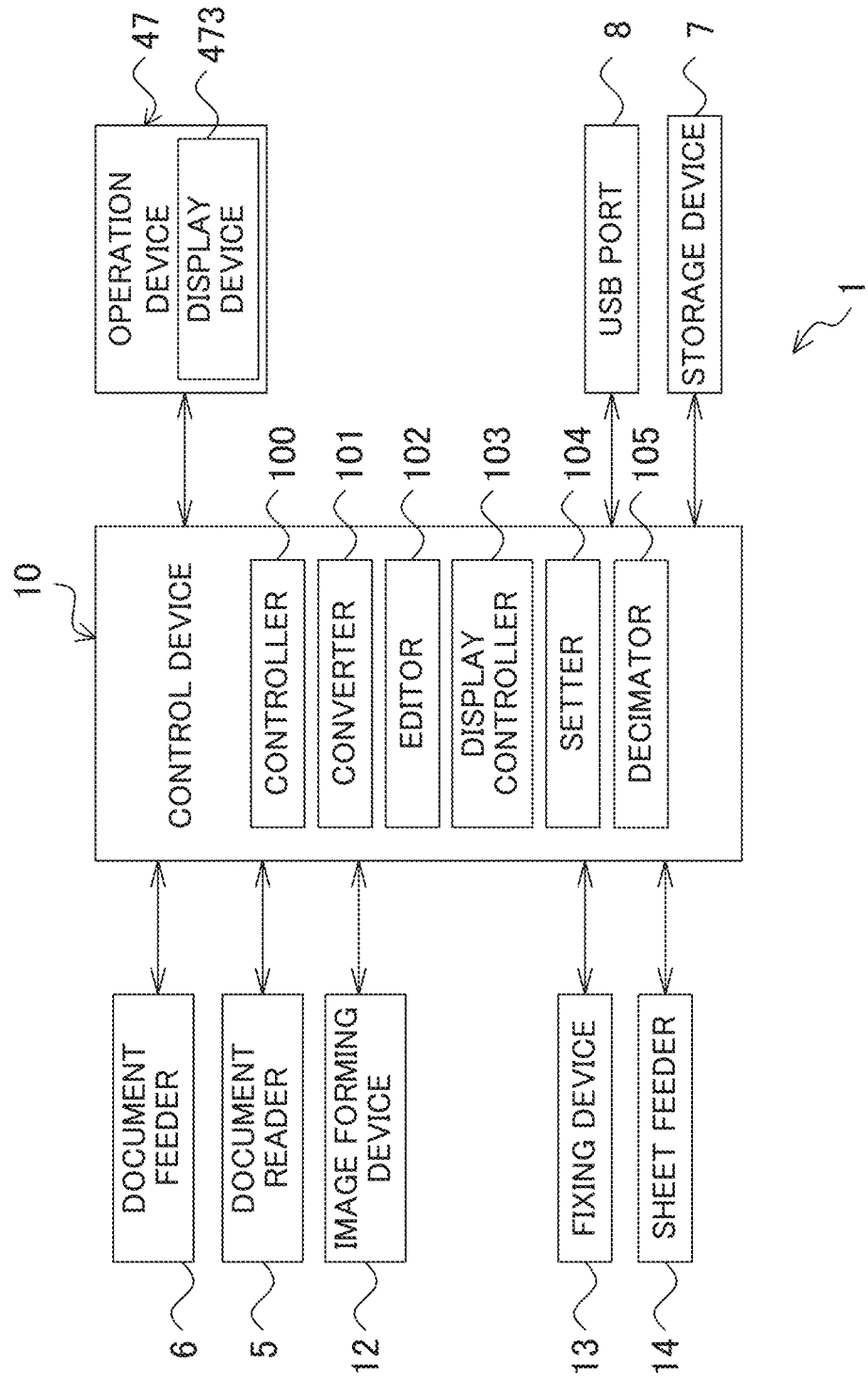
FIG. 18 is a functional block diagram schematically showing an essential internal configuration of an image forming apparatus according to a second embodiment.

FIG. 18 is a functional block diagram schematically showing an essential internal configuration of an image forming apparatus according to a second embodiment. An image forming apparatus 1 according to the second embodiment is different from the image forming apparatus 1 according to the first embodiment shown in FIGS. 1 and 2, only in that the control device 10 further functions as a decimator 105. When the above processor operates in accordance with a control program stored on the storage device 7, the control device 10 further functions as a decimator 105, in addition to the controller 100, the converter 101, the editor 102, the display controller 103, and the setter 104.

The decimator 105 performs processing for decimating, at a predetermined rate, document images forming a document image sequence after being edited by the editor 102. Specifically, the decimator 105 performs processing for deleting from the document image sequence a number of frames specified by an operator's operation on the operation device 47 every number of frames further specified by the operator. For example, the decimator 105 decimates the document image sequence by deleting 39 frames every 40 frames. In this case, for example, when a document image sequence consists of 720 frames, the number of document image frames left by the decimation by the decimator 105 is 18.

Figure 19:
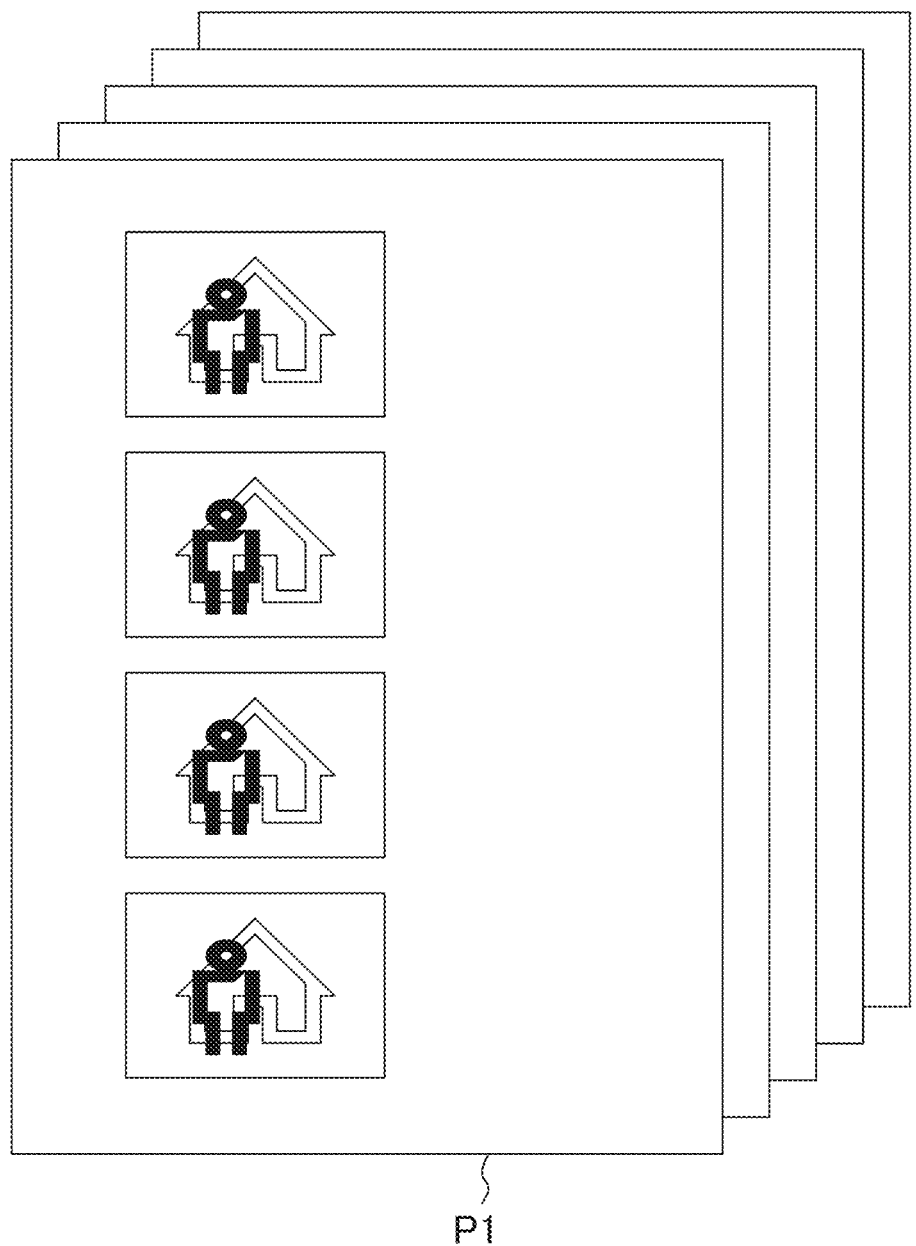
FIG. 19 is a view showing an example of a product obtained by the image forming apparatus.

When the controller 100 accepts a decimation instruction to delete a specified number of frames every specified number of frames in response to an operator's operation on the operation device 47, the decimator 105 decimates document images forming a document image sequence in accordance with the decimation instruction. The controller 100 controls the operation of the image forming device 12 and other devices to allow these devices to do an aggregating print (for example, 2 in 1, 4 in 1 or 16 in 1) of document images left by decimation by the decimator 105. Thus, a printed matter P1 in which some scenes are extracted from a moving image to be reproduced from the document image sequence, like that shown in FIG. 19, can be obtained. The operator can visually easily imagine a completed moving image from the above printed matter P1.

In an alternative embodiment, the editor 102 further performs, with respect to document images forming a document image sequence, comparison between each pair of chronologically adjacent document images based on pattern matching or like techniques. If the similarity between the compared pair of document images does not reach a predetermined level (for example, 80%), the editor 102 detects the latter of the pair of document images as an extractive image. The editor 102 extracts all the extractive images detected from the document image sequence. The controller 100 controls the operation of the image forming device 12 and other devices to allow these devices to do an aggregating print of the extractive images extracted by the editor 102. Thus, among the document images forming the document image sequence, document images bringing about changes in contents are extracted. Therefore, a printed matter P1 in which scenes containing large changes in contents are extracted from a moving image to be reproduced can be obtained.

In the second embodiment and the above alternative embodiment, the decimation processing and extraction processing for the purpose of obtaining a printed matter P1 can be seamlessly performed after the reading of original documents for the purpose of obtaining document images as materials for a moving image file, and, in addition, a moving image file can be easily created from paper-based original documents.

The present disclosure is not limited to the structures and configurations of the above embodiments and can be modified in various ways. Furthermore, in relation to the present disclosure, by equipping the image forming apparatus 1 with a coin vendor and making it accessible to the public, a new business model can be built.

The structures, configurations, and processing described in the above embodiments with reference to FIGS. 1 to 19 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a storage device that stores a document image sequence in which a plurality of document images of original documents are arranged in chronological order;
   a display device; and
   a control device including a processor and functioning, through the processor executing a control program, as:
      an editor that performs edition processing on a document image forming the document image sequence;
      a converter that converts the document image sequence edited by the editor to a moving image; and
      a display controller that allows the display device to display the document images forming the document image sequence in an image display area of the display device; and
   an operation device through which an instruction is input,
   wherein the editor performs, as the edition processing, processing for creating a synthetic image in which a new document image specified by an instruction accepted through the operation device is layered as an upper layer or a background layer specified by an instruction accepted through the operation device on top of or under, among the document images forming the document image sequence, the document image specified by an instruction accepted through the operation device, and
   the converter converts the document image sequence containing as the document image the synthetic image created by the editor to a moving image.

2. The electronic device according to claim 1, wherein the display controller allows the display device to display in the image display area an image obtained by overlaying the document image placed in the upper layer on the document image placed in the background layer.

3. An electronic device comprising:
   a storage device that stores a document image sequence in which a plurality of document images of original documents are arranged in chronological order;
   a display device; and
   a control device including a processor and functioning, through the processor executing a control program, as:
      an editor that performs edition processing on a document image forming the document image sequence;
      a converter that converts the document image sequence edited by the editor to a moving image; and
      a display controller that allows the display device to display the document images forming the document image sequence in an image display area of the display device; and
   an operation device through which an instruction is input,
   wherein the control device further functions as a setter that sets a reproduction speed for the document images in accordance with a speed setting instruction accepted through the operation device, and
   the converter converts the document images to a moving image by employing the reproduction speed set by the setter as a reproduction speed for the document images.

4. An image forming apparatus comprising:
   an image forming device that forms an image on a recording paper sheet; and
   an electronic device comprising:

a storage device that stores a document image sequence in which a plurality of document images of original documents are arranged in chronological order;

a display device; and a control device including a processor and functioning, through the processor executing a control program, as:

an editor that performs edition processing on a document image forming the document image sequence;

a converter that converts the document image sequence edited by the editor to a moving image;

a display controller that allows the display device to display the document images forming the document image sequence in an image display area of the display device; and a controller that controls operation of the image forming device, wherein the editor further performs extraction processing for extracting, from among the document images forming the document image sequence, document images each falling short of a predetermined level of similarity to a chronologically adjacent document image, and the controller allows the image forming device to do an aggregating print of the document images extracted by the editor.

* * * * *